United States Patent
Xu et al.

(10) Patent No.: US 7,476,031 B2
(45) Date of Patent: Jan. 13, 2009

(54) LINEAR GUIDE DEVICE

(75) Inventors: Wei Xu, Machida (JP); Masaru Akiyama, Maebashi (JP)

(73) Assignee: NSK Ltd., Tokyo (JP)

( * ) Notice: Subject to any disclaimer, the term of this patent is extended or adjusted under 35 U.S.C. 154(b) by 403 days.

(21) Appl. No.: 10/581,795

(22) PCT Filed: Dec. 6, 2004

(86) PCT No.: PCT/JP2004/018154

§ 371 (c)(1),
(2), (4) Date: Jun. 2, 2006

(87) PCT Pub. No.: WO2005/068860

PCT Pub. Date: Jul. 28, 2005

(65) Prior Publication Data
US 2007/0133910 A1    Jun. 14, 2007

(30) Foreign Application Priority Data

| Dec. 5, 2003 | (JP) | ............................ 2003-407767 |
| Jul. 2, 2004 | (JP) | ............................ 2004-196948 |
| Aug. 27, 2004 | (JP) | ............................ 2004-248507 |

(51) Int. Cl.
F16C 29/06 (2006.01)
(52) U.S. Cl. ...................................................... 384/45
(58) Field of Classification Search ............... 384/43–45
See application file for complete search history.

(56) References Cited

U.S. PATENT DOCUMENTS 4,511,188 A * 4/1985 Walter et al. ................... 384/43

(Continued)

FOREIGN PATENT DOCUMENTS

JP    60-139912 A    7/1985

(Continued)

OTHER PUBLICATIONS

International Preliminary Report on Patentability dated Jul. 27, 2006 (4 pages).

(Continued)

Primary Examiner—Thomas R Hannon
(74) Attorney, Agent, or Firm—Crowell & Moring LLP

(57) ABSTRACT

A linear guide device has a guide rail 12, a slider body 15, an end cap 16, a large number of rolling bodies 18, and separators 22. The slider body 15 has a slider side rolling body raceway surface opposed to a rail side rolling body raceway surface 13 formed on the guide rail 12. The end cap 16 has a rolling body direction switching path 21 communicating with a rolling body load rolling path 19 formed between both rolling body raceway surfaces of the guide rail 12 and the slider body 15 and also communicating with a rolling body return path 20 formed in a penetrating manner in the slider body 15, along the longitudinal direction of the guide rail 12. In conjunction with relative linear movement of a slider 14 constituted of the slider body 15 and the end cap 16, the rolling bodies 18 roll in the rolling body load rolling path 19, the rolling body return path 20, and a rolling body direction switching path 21. The separators 22 are arranged between every two adjacent rolling bodies 18. The end cap 16 has a throughhole 25 for assembling the rolling bodies 18 and the separators 22 from the outside of the slider 14 into the rolling body return path 19 and also has a cap member 26 removably fitted in the through-hole 25. The cap member 26 forms part of the rolling body direction switching path 21.

21 Claims, 45 Drawing Sheets

U.S. PATENT DOCUMENTS 4,927,273 A * 5/1990 Mottate ................ 384/45
4,989,996 A   2/1991 Binder et al.

FOREIGN PATENT DOCUMENTS

| JP | 2-283913 A | 11/1990 |
| JP | 2004-205014 A | 7/2004 |
| JP | 2005-140273 A | 6/2005 |

OTHER PUBLICATIONS

International Search Report dated Apr. 12, 2005 (One (1) page).

* cited by examiner

FIG. 17
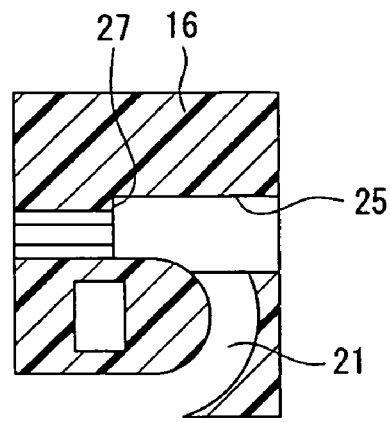
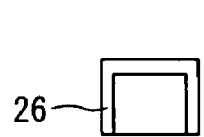
FIG. 18A
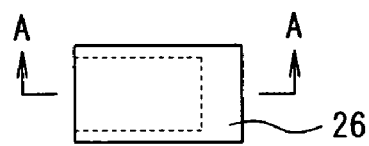
FIG. 18B
FIG. 18C

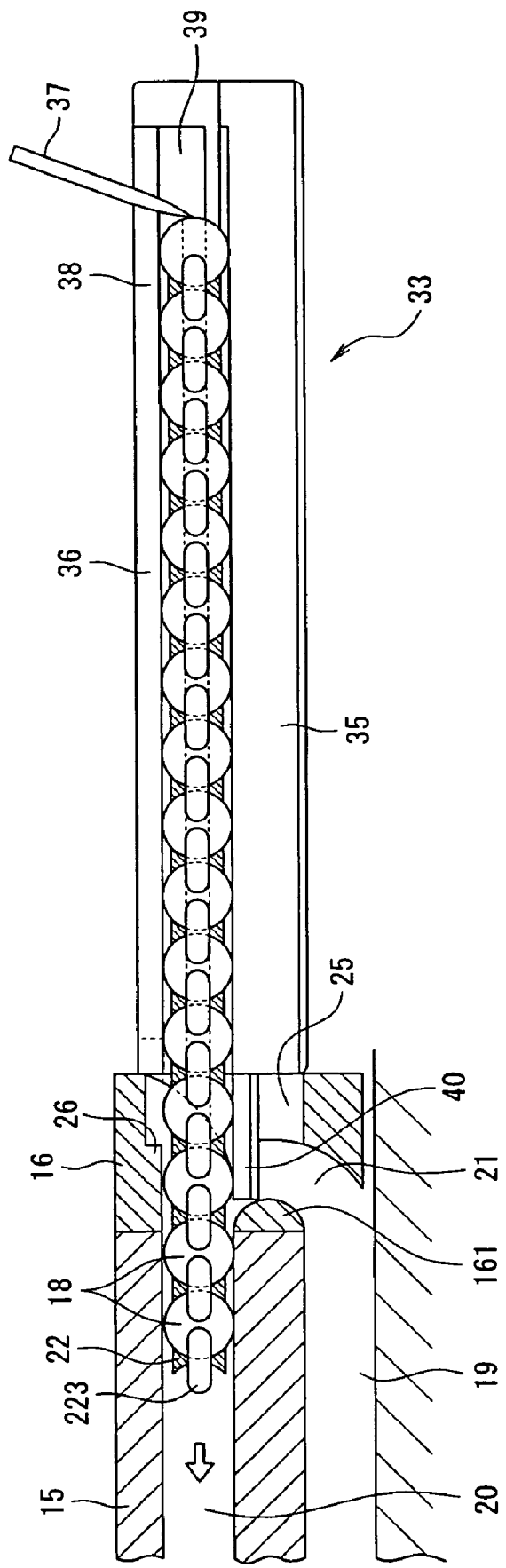

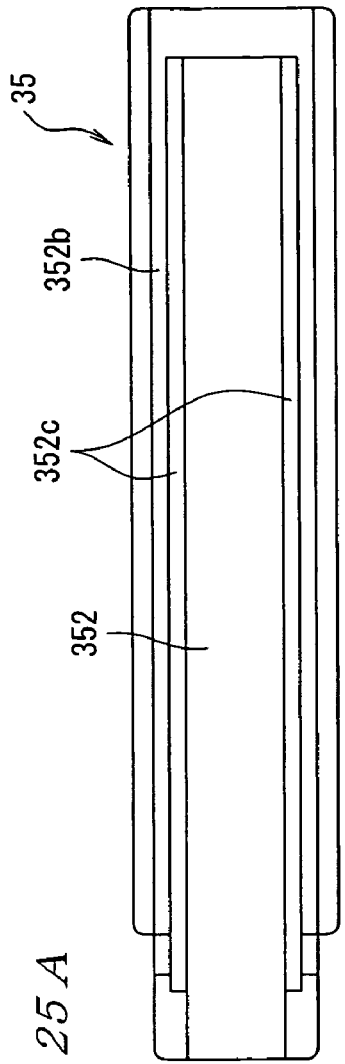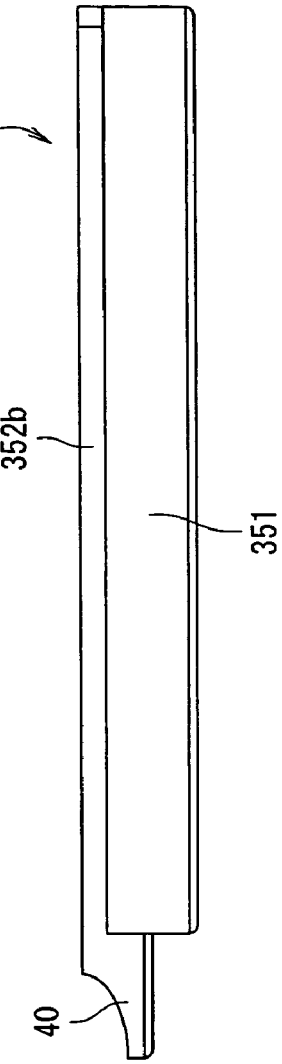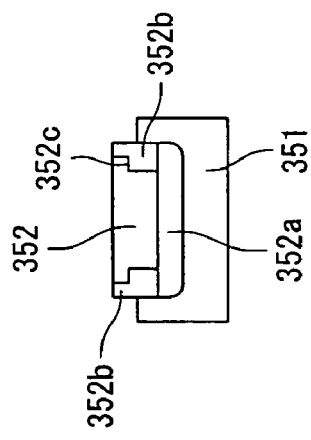

F I G. 27
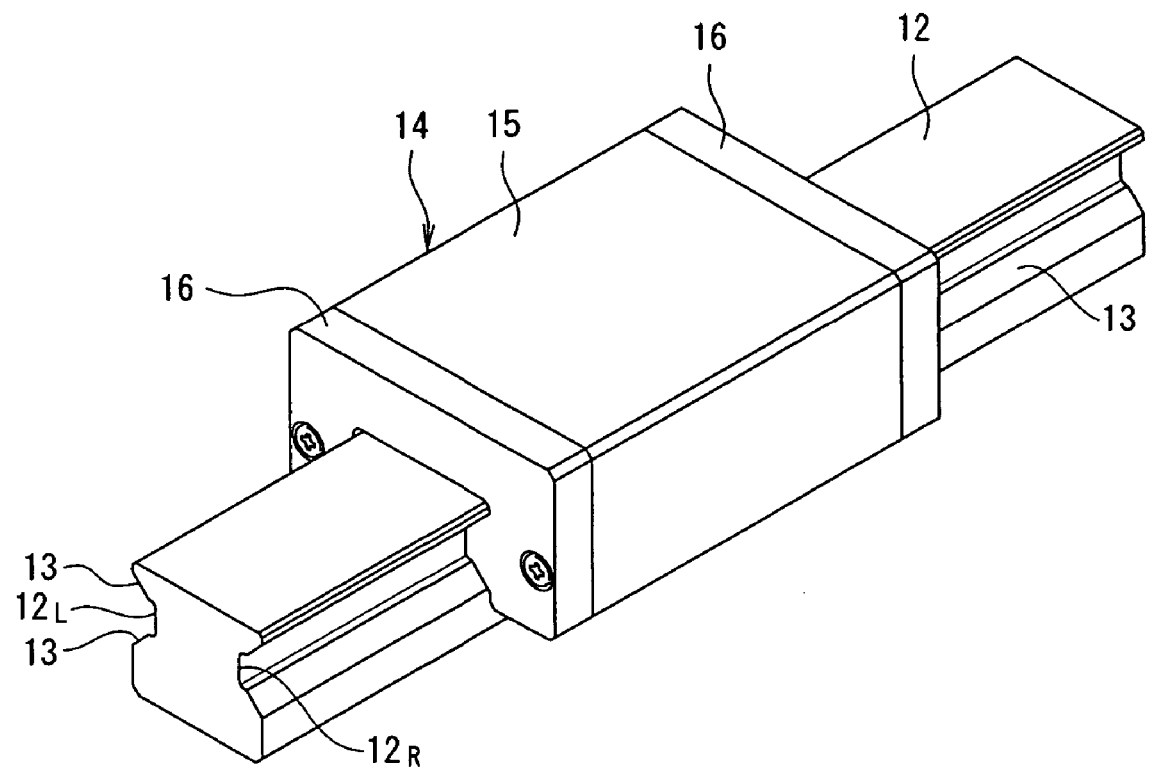

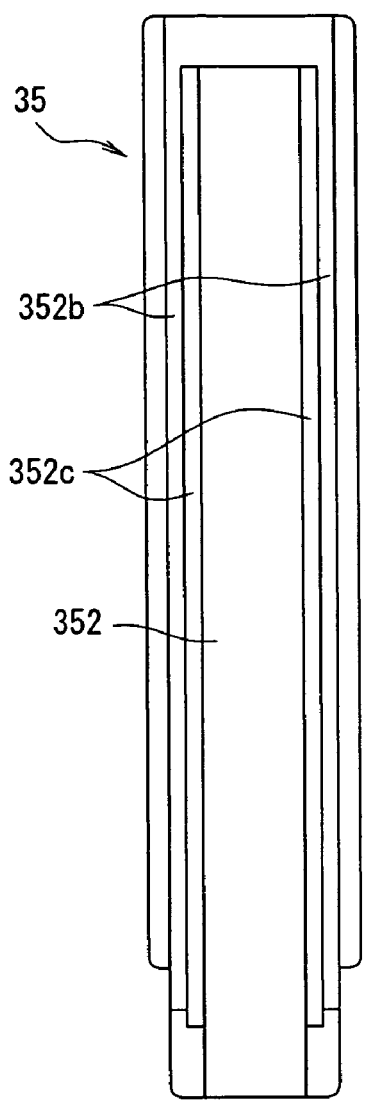
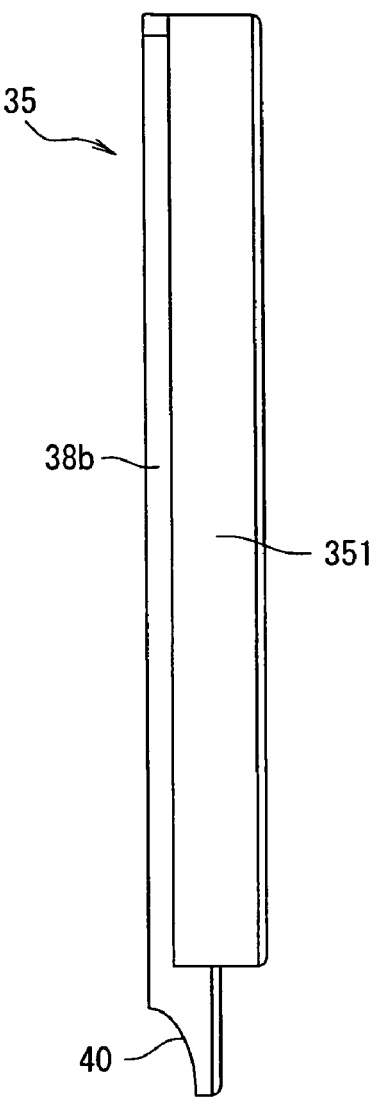
FIG. 31A    FIG. 31B
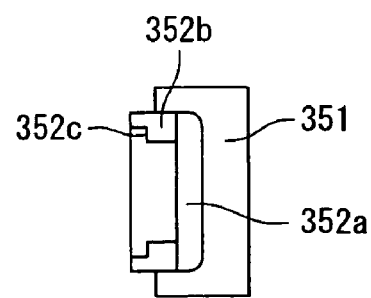
FIG. 31C

FIG. 46
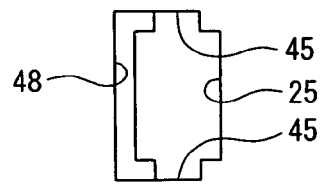
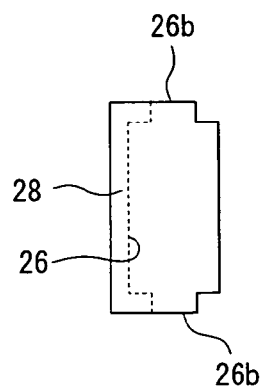   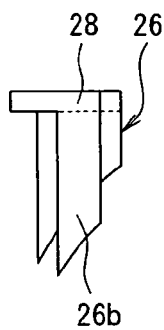   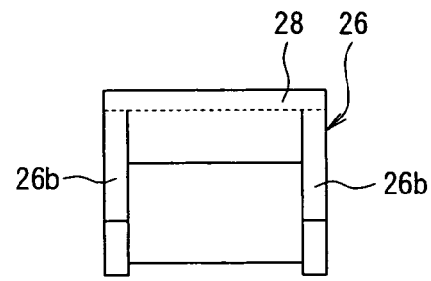
*FIG. 47A*    *FIG. 47B*    *FIG. 47C*
FIG. 48
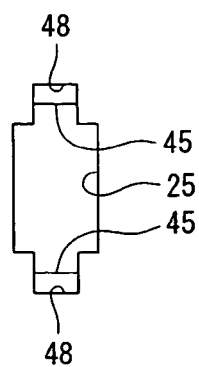

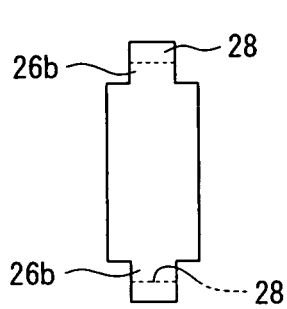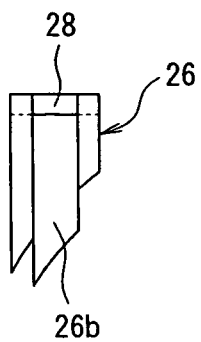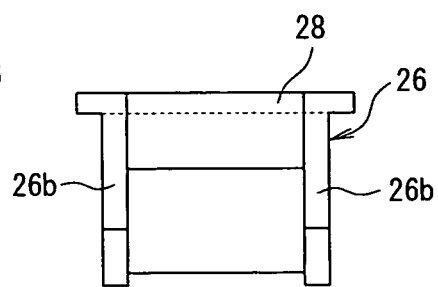
*F I G. 49 A*  *F I G. 49 B*  *F I G. 49 C*
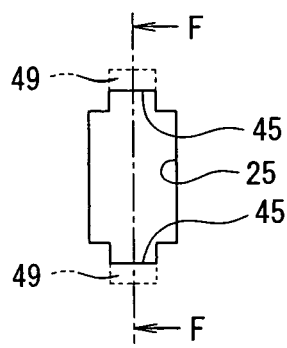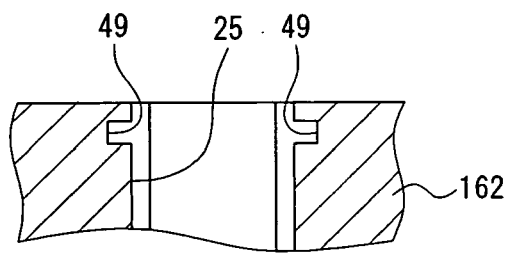
*F I G. 50 A*  *F I G. 50 B*
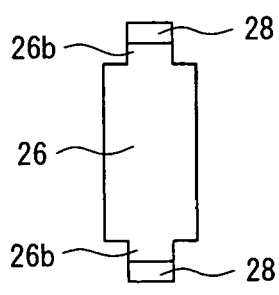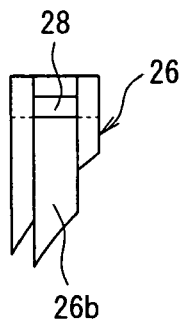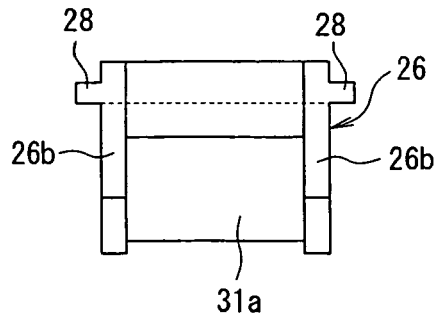
*F I G. 51 A*  *F I G. 51 B*  *F I G. 51 C*

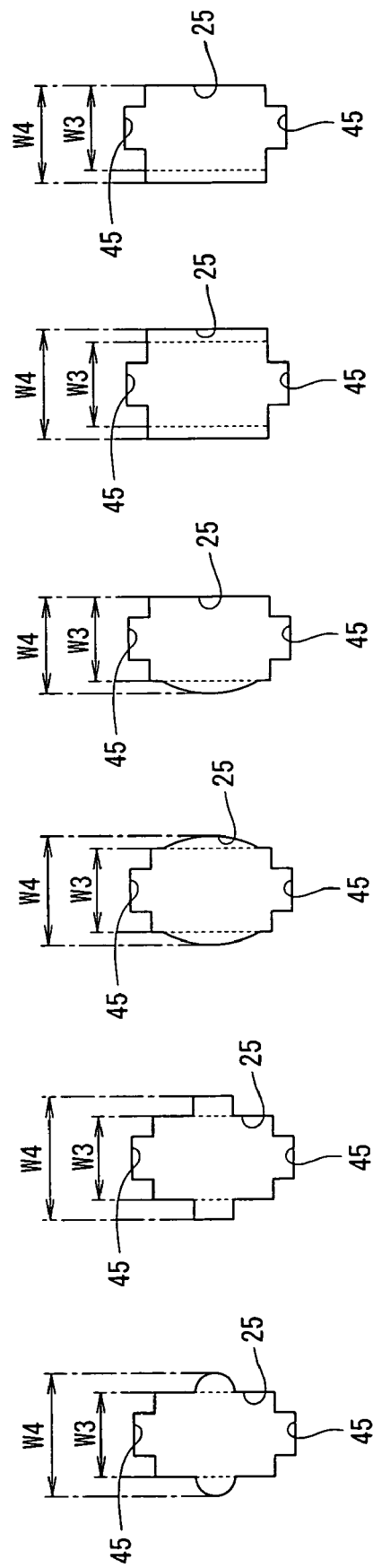

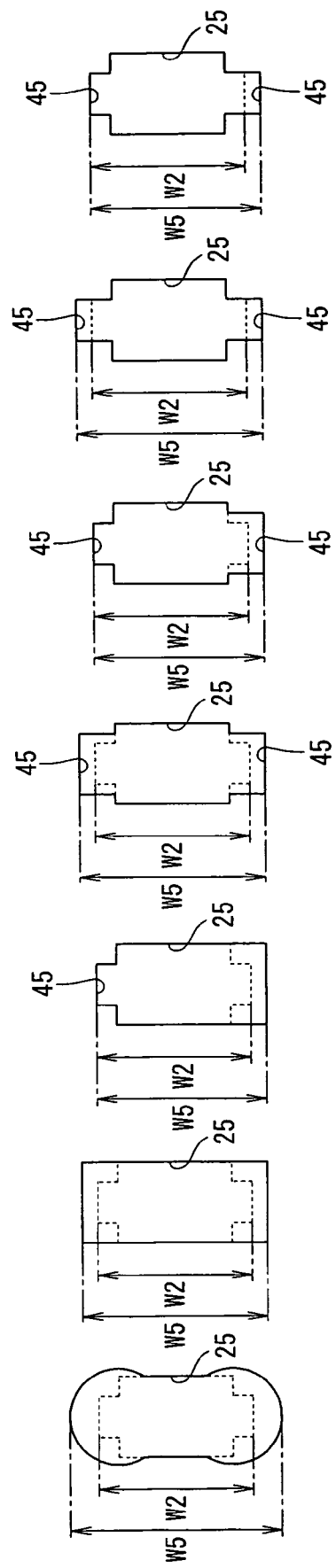

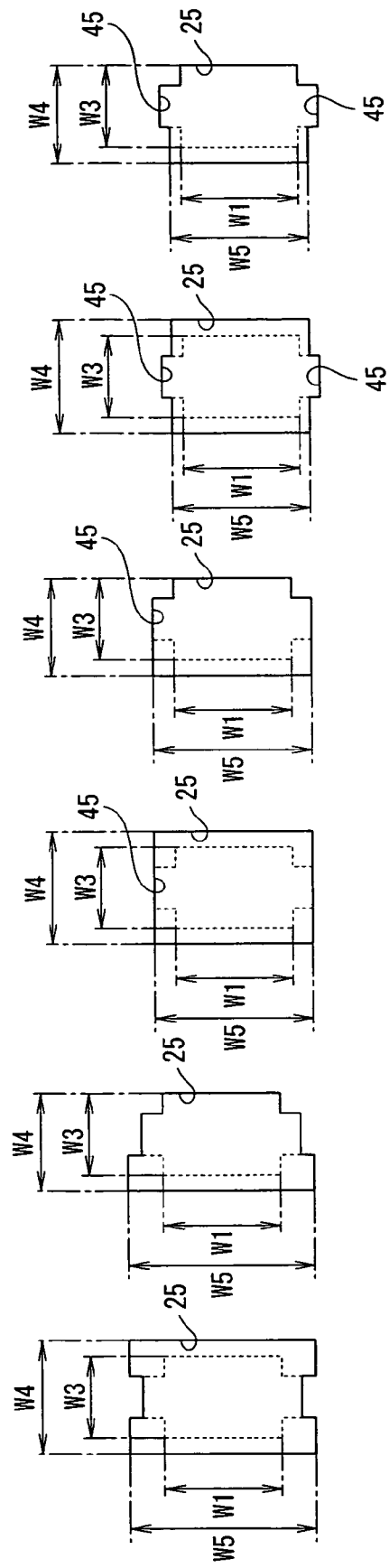

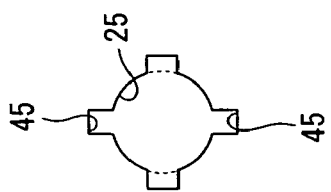
FIG. 60G
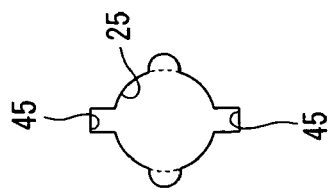
FIG. 60F
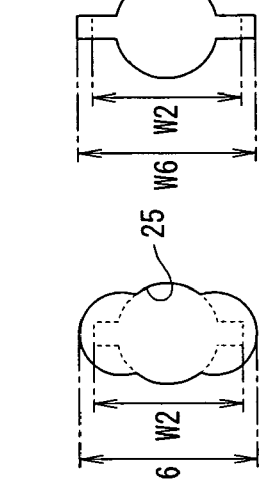
FIG. 60E
FIG. 60D
FIG. 60C
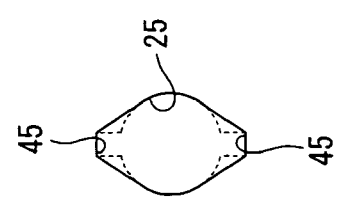
FIG. 60B
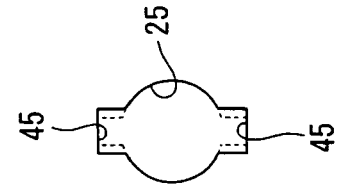
FIG. 60A FIG. 61
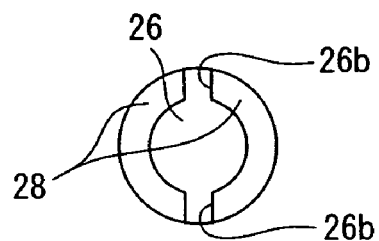
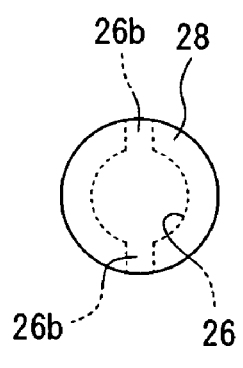 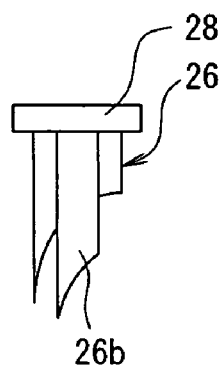 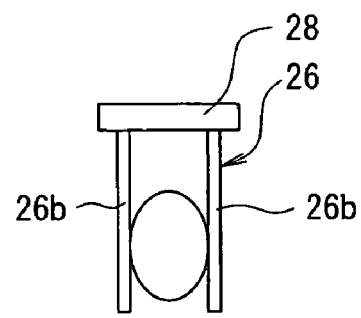
FIG. 62A     FIG. 62B     FIG. 62C

LINEAR GUIDE DEVICE

TECHNICAL FIELD

The present invention concerns a linear guide device used as a device for guiding a linearly moving body such as a work table in industrial machines, for example, machine tools in the moving direction thereof

BACKGROUND ART

A linear guide device used in various kinds of industrial machines such as machine tools generally has a constitution as shown in FIG. 63 to FIG. 65 and includes a guide rail 12, a slider main body 15, and two end caps 16.

The guide rail 12 is formed linearly and rolling element raceway surfaces (hereinafter referred to as "rail side rolling element raceway surface") 13 are formed each by two on the left lateral surface 12L and the right lateral surface 12R of the guide rail 12 along the longitudinal direction of the guide rail 12.

The slider main body 15, together with the two end caps 16, constitutes a slider 14. Further, the slider main body 15 has two inner wall surfaces 15a (only one of them is illustrated in FIG. 64) opposing to the left lateral surface 12L and the right lateral surface 12R of the guide rail 12 respectively, and two rolling element raceway surfaces (hereinafter referred to as "slider side rolling element raceway surface") 17 are formed respectively on the inner wall surfaces 15a.

The slider side rolling element raceway surfaces 17 oppose to the rail side rolling element raceway surfaces 13 respectively, and rolling element load rolling channels 19 for rolling the rolling elements 18 in the longitudinal direction of the guide rail 2 are formed between the rail side rolling element raceway surfaces 13 and the slider side rolling element raceway surfaces 17 as shown in FIG. 65.

In the slider main body 15, rolling element return channels 20 (refer to FIG. 65) for returning rolling elements 18 after rolling through the rolling element load rolling channels 19 along with relative linear motion of the slider 14 (refer to FIG. 65) are formed in the slider main body 15. The rolling element return channels 20 are formed in the slider main body 15 along the longitudinal direction of the guide rail 12, and rolling element direction changing channels 21 in communication with the rolling element load rolling channels 19 and the rolling element return channels 20 are formed in each of the end caps 16 constituting, together with the slider main body 15, the slider 14 (refer to FIG. 65).

The rolling element direction changing channels 21 are bent substantially in a U-shaped configuration and, accordingly, the rolling elements 18 after rolling through the rolling element load rolling channels 19 and the rolling element return channels 20 are switched for the direction in the rolling element direction changing channels 21.

The rolling element 18 is formed into a cylindrical shape, and a separator 22 interposed between each of the rolling element 18 (refer to FIG. 65) is formed of a material softer than the rolling element 18 (for example, resin) in order to suppress the increase in the levels of vibrations and noises caused by collision between the rolling elements against each other.

By the way, in a case of assembling the linear guide device as described above, a slider 14 is assembled to a provisional shaft 23 simulating a guide rail, for example, as shown in FIG. 66, and rolling elements 18 and separators are assembled into the slider 14 from the end of the slider 14 not assembled to the provisional axis 23 to assemble the rolling elements 18 and the separators into the slider 14 and then the linear guide device is assembled.

However, since the operation is conducted in a narrow space upon assembling the rolling elements 18 and the separators 22 in the slider 14 by the method described above, it takes much time and labor for assembling the linear guide device. Further, since the rolling elements 18 and the separators 22 have to be assembled while confining the place where the rolling elements 18 and the separators 22 by a mirror, it takes much time and labor for the operation of assembling the rolling elements 18 and the separators 22. Further, upon assembling the rolling elements 18 and the separators 22 into the slider 14, the separators 22 sometimes turn down in the slider 14.

DISCLOSURE OF THE INVENTION

The present invention has been achieved while taking notice on such problems and it is an object thereof to provide a linear guide device in which the rolling elements and the separators can be assembled easily into the slider thereby improving the assembling property.

For attaining such an object, the present invention provides a linear guide device including a guide rail, a slider main body having rolling element raceway surfaces opposing to rolling element raceway surfaces formed on the guide rail along the longitudinal direction of the guide rail, end caps each having rolling element direction changing channels in communication with rolling element direction changing channels formed between both of rolling element raceway surfaces of the guide rail and the slider main body and in communication with rolling element return channels perforated through in the slider main body along the longitudinal direction of the guide rail, a plurality of rolling elements that roll through the rolling element load rolling channel, the rolling element return channel, and the rolling element direction changing channel along with the relative linear motion of a slider comprising the slider main body and the end caps, and a plurality of separators each interposed between adjacent two rolling elements among the plurality of the rolling elements, in which the end cap has through-holes for assembling the rolling elements and the separators from the outside of the slider into the rolling element return channel.

In the linear guide device according to the invention, the end cap preferably has cap members for dosing the through-holes. The cap members further preferably fit in the through-holes thereby forming portions of the rolling element direction changing channel.

In the linear guide device according to the invention, a rolling element formed into a roller shape or a spherical shape can be used suitably. In this case, the separator preferably has a concave rolling element contact surface in contact with the rolling element. Further, the separator preferably has a main body portion situated between two rolling elements and a pair of right and left arm portions disposed on both sides of the main body portion. Further, the through-hole preferably has guide grooves slidably engaging the arm portions of the separator, and the rolling element return channel and the rolling element direction changing channel preferably have guide grooves slidably engaging the arm portions of the separator.

In the linear guide device according to the invention, the separators may be connected in a row by a flexible belt-like connection member. Further, while the through-holes are preferably formed in the end cap coaxially with an extension line extended from the center line of the rolling element return channel, it may also be formed in the end cap so as to cross the extension line extended from the center line of the rolling element return channels.

In the linear guide device according to the invention, while the through-holes are preferably formed in the end cap with an area of opening being larger than the area of opening of the rolling element return channel, it may also be formed in the end cap with an area of opening being substantially equal with the area of opening for the rolling element return channel.

In the linear guide device according to the invention, the through-holes may be formed into a shape including a portion of the cross sectional shape of the rolling element return channel. Further, the end cap preferably has positioning portions for positioning the cap members. In this case, the cap members preferably have engaging portions that engage the positioning portions.

In the linear guide device according to the invention, the rolling elements and the separators are preferably assembled from the through-holes into the slider by using a rolling element insertion jig having two inner wall surfaces opposing to the rolling element or the arm portion of the separator respectively.

In this case, the rolling element insertion jig is more preferably formed into such a shape as fitting in through-hole. Further, the end cap preferably has positioning portions that engage the top end of the rolling element insertion jig to position the rolling element insertion jig and also position the cap members.

BRIEF DESCRIPTION OF THE DRAWINGS

FIG. 17 is a view showing a XVII-XVII cross section of FIG. 16.

FIG. 18A to FIG. 18C are views showing a direction changing channel forming member of FIG. 11 in which FIG. 18A is a front elevational view, FIG. 18B is a plane view, and FIG. 18C is an A-A cross sectional view of FIG. 18B.

FIG. 24 is a view showing an example of a rolling element insertion jig.

FIG. 25A to FIG. 25C are views showing a jig main body of FIG. 24 in which FIG. 25A is a plane view of the jig main body, FIG. 25B is a front elevational view of the jig main body, and FIG. 25C is a side elevational view of the jig main body.

FIG. 26A to FIG. 26C are views showing a lid of FIG. 24 in which FIG. 26A is a plane view of the lid, FIG. 26B is a front elevational view of the lid, and FIG. 26C is a side elevational view of the lid.

FIG. 27 is a perspective view of a linear guide device according to a fifth embodiment of the invention.

FIG. 31A to FIG. 31C are views showing the jig main body of FIG. 30 in which FIG. 31A is a plane view of the jig main body, FIG. 31B is a front elevational view of the jig main body, and FIG. 31C is a side elevational view of the jig main body.

FIG. 32A to FIG. 32C are views showing a lid of FIG. 30 in which FIG. 32A is a plane view of the lid, FIG. 32B is a front elevational view of the lid, and FIG. 32C is a side elevational view of the lid.

FIG. 46 is a view showing a modified example of a positioning portion shown in FIG. 36.

FIG. 47A to FIG. 47C are views showing the constitution of a cap member fitted to a through-hole in FIG. 46.

FIG. 48 is a view showing a modified example of the through-hole shown in FIG. 36.

FIG. 49A to FIG. 49C are views showing a cap member for closing a through-hole of FIG. 48.

FIG. 50A and FIG. 50B are views showing a main portion of a linear guide device according to a seventh embodiment of the invention.

FIG. 51A and FIG. 51C are views showing a cap member for closing the through-hole of FIG. 50A and FIG. 50B.

FIG. 56A to FIG. 56F are views showing an example in a case of making the length of the shorter side of the through-hole larger than the diameter of a rolling element.

FIG. 57A to FIG. 57G are views showing an example in a case of making the length of the longer side of a through-hole larger than the inter-arm size of a separator.

FIG. 58A to FIG. 58F are views showing an example in a case of making the length for the shorter side of a through-hole larger than the diameter for a rolling element, and making the length for the longer side of the through-hole larger than the axial length of the rolling element.

FIG. 60A to FIG. 60G are views showing an example of a through-hole in a case where the rolling element is formed into a spherical shape.

FIG. 61 is a front elevational view of a cap member fitting to the through-hole of FIG. 60A to FIG. 60G.

FIG. 62A to FIG. 62C are view showing the constitution of the cap member shown in FIG. 61.

BEST MODE FOR PRACTICING THE INVENTION

Figure 63:
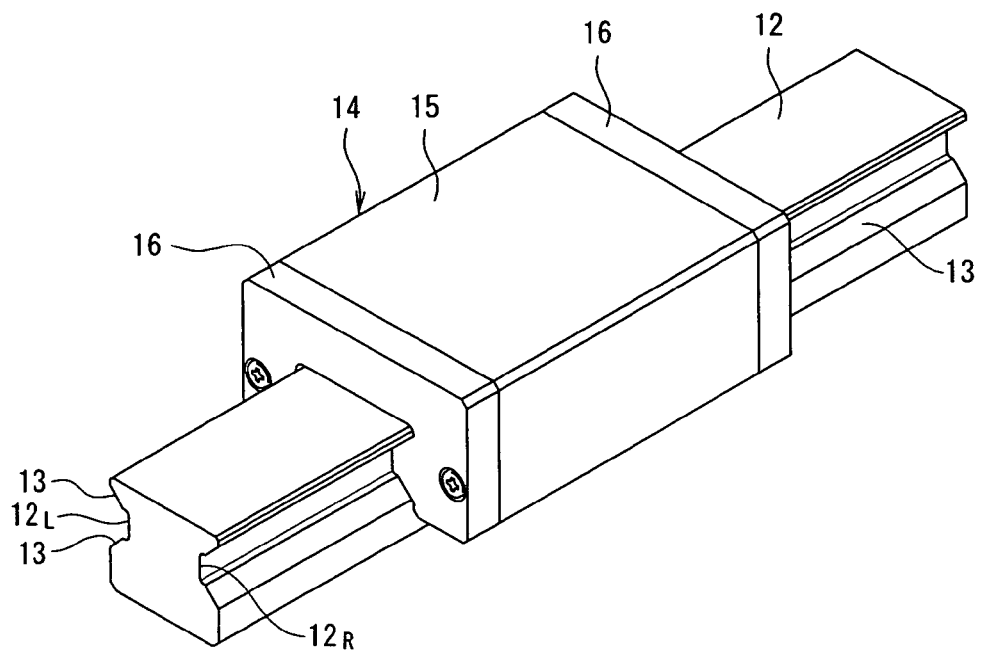
FIG. 63 is a perspective view of an existent linear guide device.
Figure 64:
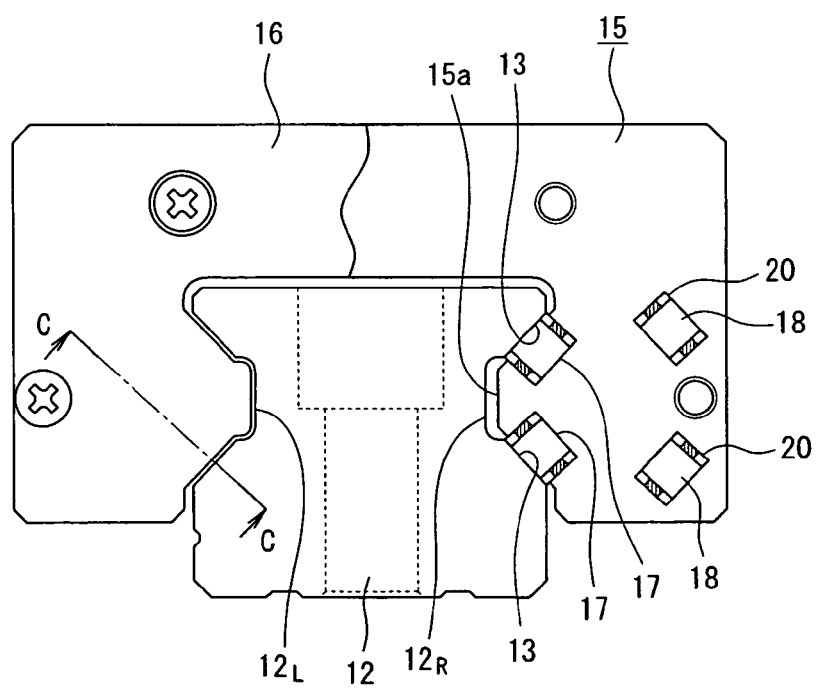
FIG. 64 is a front elevational view of the linear guide device shown in FIG. 63.
Figure 65:
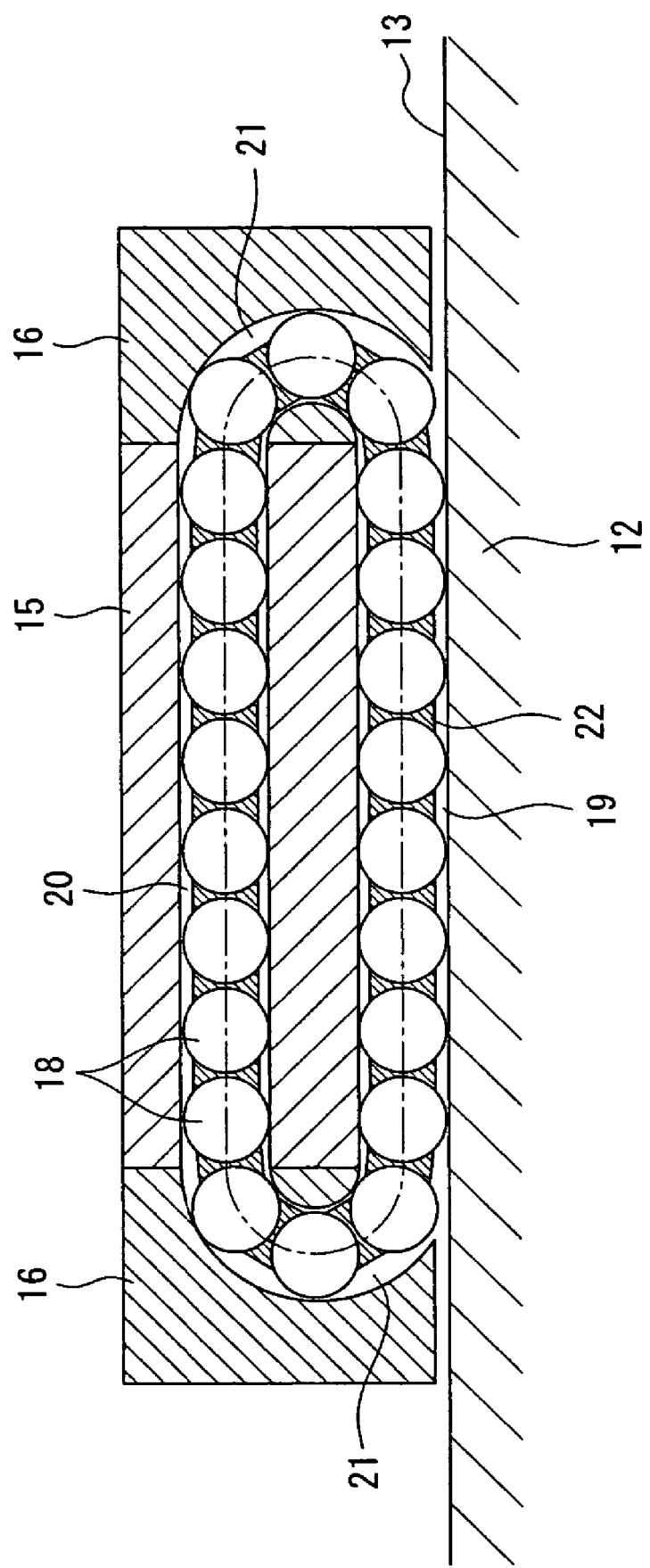
FIG. 65 is a C-C cross sectional view of FIG. 64.

A first embodiment of the present invention is to be described with reference to FIG. 1 to FIG. 6, in which identical or corresponding portions to those shown in FIG. 63 to FIG. 65 carry identical reference numerals, for which detailed descriptions are to be omitted.

Figure 1:
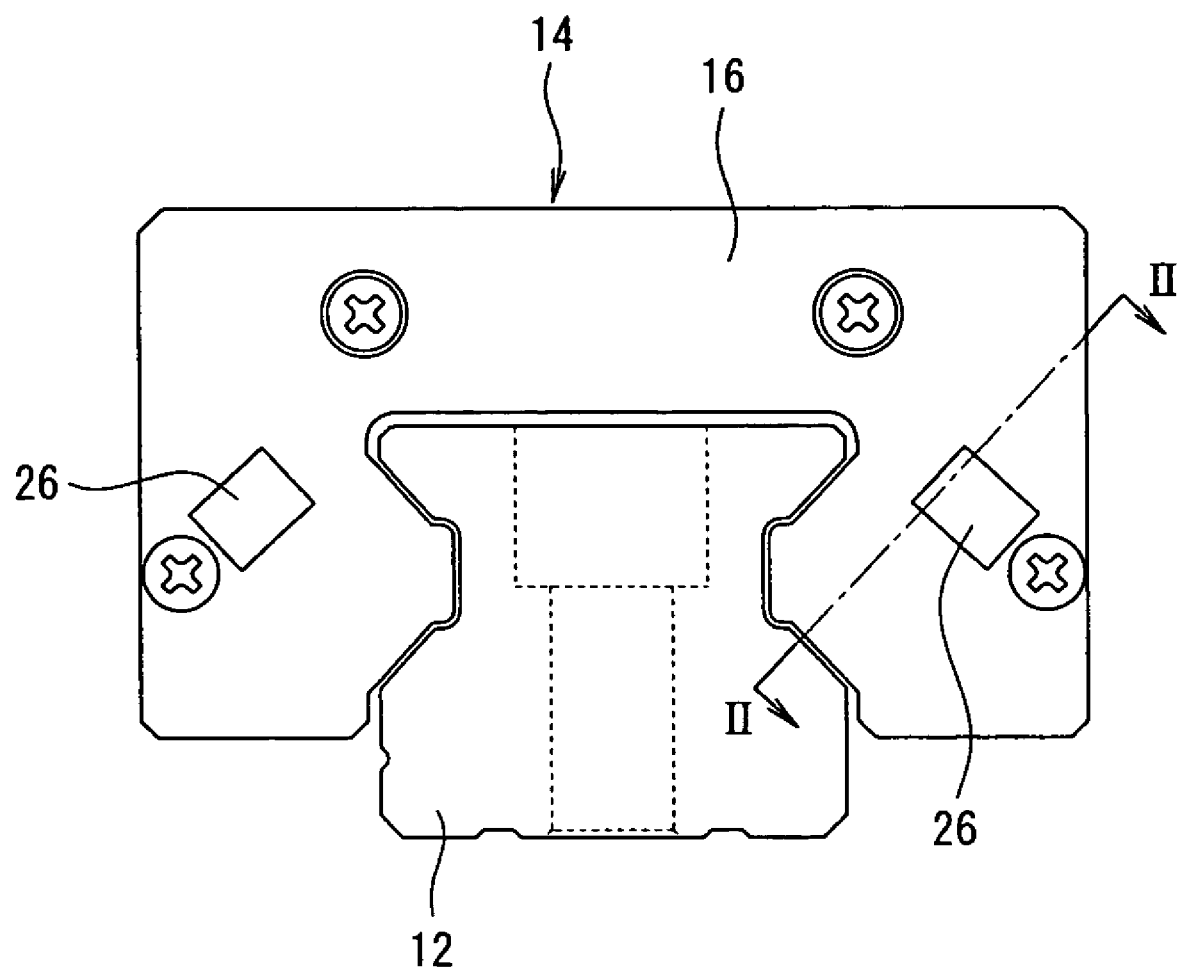
FIG. 1 is a front elevational view of a linear guide device according to a first embodiment of the present invention.
Figure 2:
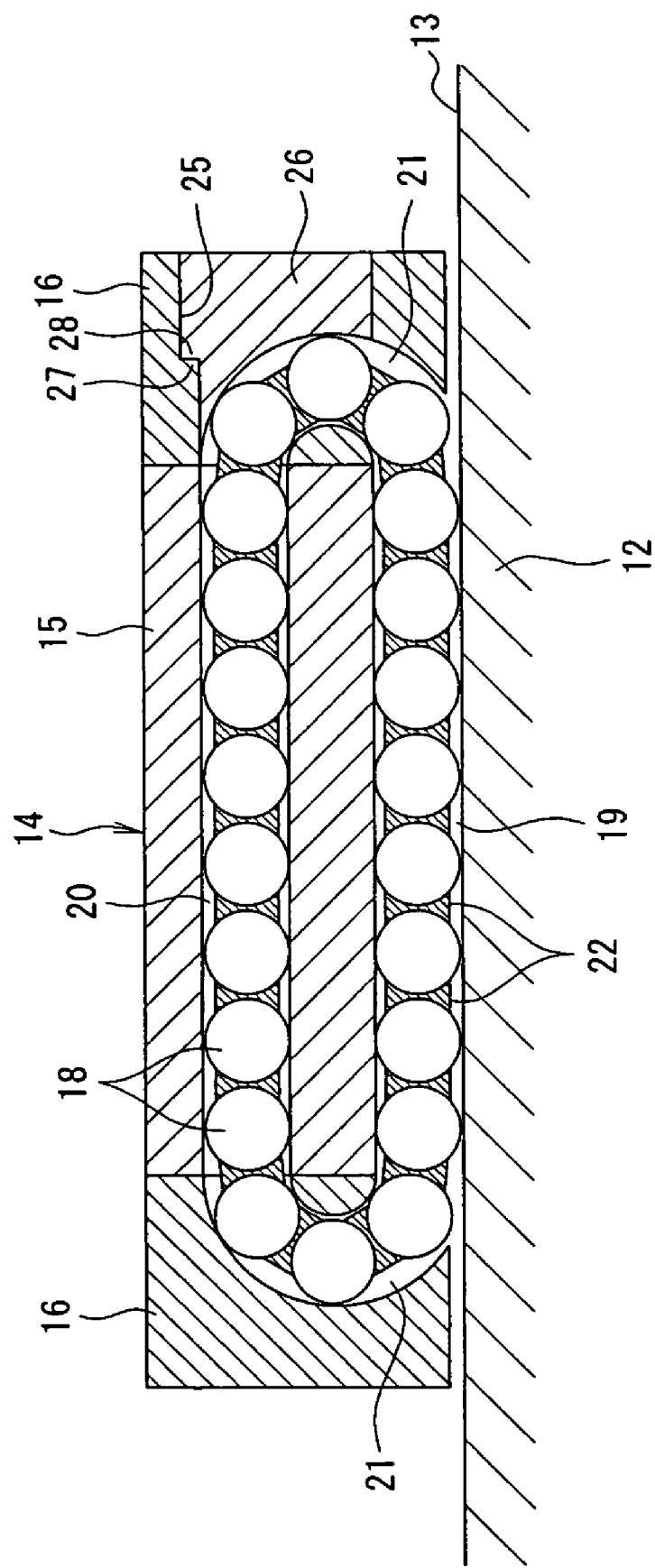
FIG. 2 is a view showing a II-II cross section of FIG. 1.

In FIG. 1, a linear guide device according to the first embodiment of the invention has a guide rail 2, a slider main body 15, and two end caps 16. In the end cap 16, as shown in FIG. 2, through-holes 25 for assembling rolling elements 18 and separators 22 from the outside of the slider 14 into rolling element return channels 20 of the slider main body 15 are formed so as to oppose to the rolling element return channels 20. The through-holes 25 have a rectangular cross section perpendicular to the direction of assembling the rolling elements 18 and the separators 22, and are formed in the end caps 16 with an area of opening being larger than the area of opening of the rolling element return channel 20.

The end caps 16 have cap members 26 for closing the through-holes 25 (refer to FIG. 2). The cap members 26 are formed into a shape detachably fitting to the through-holes 25, and portions of rolling element direction changing channels 21 formed in the end cap 16 are formed of the cap member 26.

The end cap 16 has steps 27 as positioning portions for positioning the cap members 26 (refer to FIG. 2). The steps 27 are formed inside the through-holes 25, and engaging portions 28 are disposed to the cap members 26 for engagement with the steps 27.

In such a constitution, when the cap member members 26 are detached from the end cap 16, since the rolling element return channels 20 are in a state being opened through the through-holes 25, rolling elements 18 and separators 22 can be assembled through the through-holes 25 formed in the end caps 16 into the rolling element return channels 20 of the slider main body 15. Accordingly, since the rolling elements 18 and the separators 22 can be loaded easily in the slider 14 without using a provisional shaft 23 shown in FIG. 65 upon assembling the linear guide device, the assembling efficiency of the linear guide device can be enhanced. Further, it is not necessary as in the existent example described above to confirm where the rolling elements 18 and the separators 22 are assembled by a mirror.

Figure 4:
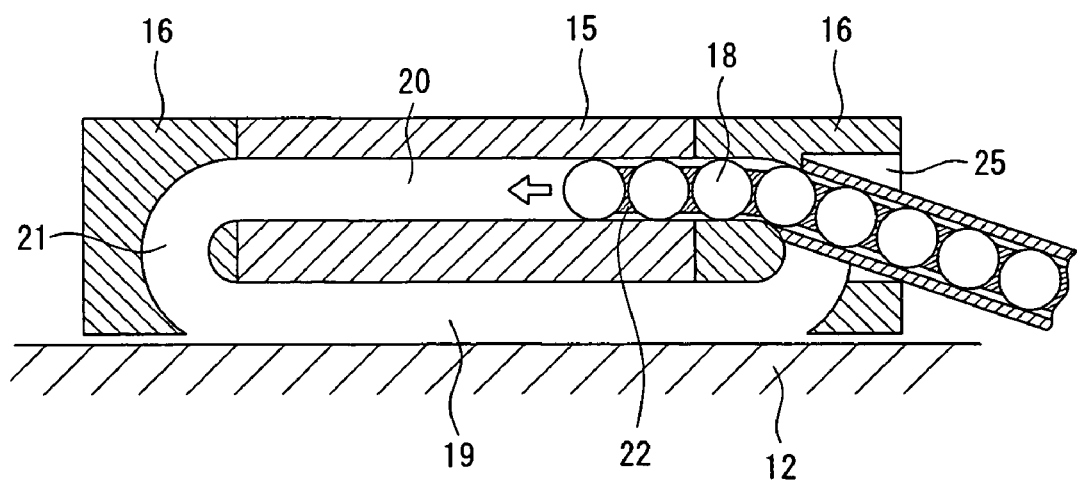
FIG. 4 is a view showing an example in a case of assembling rolling elements and separators from a through-hole formed in an end cap into a slider.

Further, since the rolling elements 18 and the separators 22 can be assembled on the side of the end cap to the inside of the slider 14, the assembling operation for the rolling elements 18 and the separators 22 can be automated as shown in FIG. 4.

Figure 3:
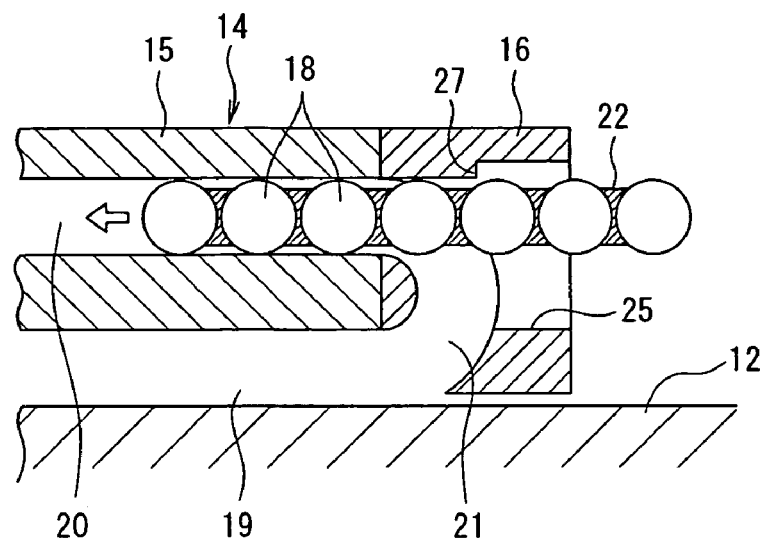
FIG. 3 is an explanatory view for explaining the operation of the linear guide device according to the first embodiment.
Figure 5:
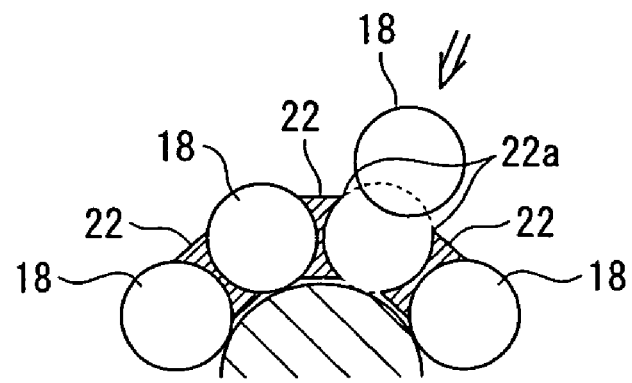
FIG. 5 is an explanatory view for explaining the problem in a case of assembling rolling elements and separators from a linear portion of a rolling element circulation channel.
Figure 6:
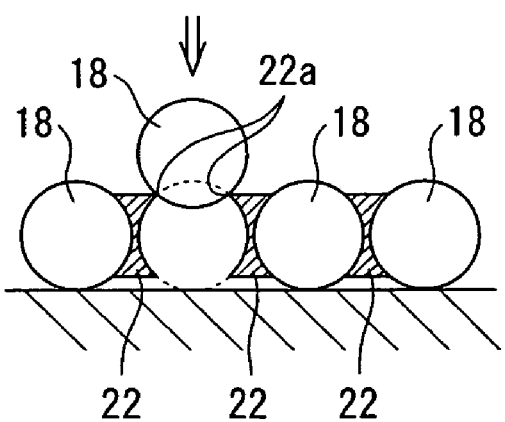
FIG. 6 is an explanatory view for explaining the advantage in a case of assembling rolling elements and separators from a linear portion of a rolling element circulation channel.

Further, since the through-holes 25 for assembling the rolling elements 18 and the separators 22 into the rolling element return channels 20 are disposed to the end caps 16 so as to oppose to the rolling element return channels 20 in the first embodiment described above, the bent portion of the rolling element changing channel 21 is widely opened as shown in FIG. 3 upon assembling the rolling elements 18 and the separators 22 into the slider 14. Thus, in a case of assembling the finally remained rolling element 18 between the separators 22, the corner 22a of the separator 22 can be prevented from being injured by the rolling element 18 (refer to FIG. 5). That is, in a case of forming the assembling port for the rolling elements and the separators to a straight portion of a rolling element circulation channel, as shown in FIG. 6, when finally remained rolling element 18 is assembled between the separators 22, the corner 22a of the separator 22 may possibly be injured by the rolling element 18. On the contrary, in the first embodiment, since the curved portion of the rolling element direction changing channel 21 is opened widely upon assembling the rolling elements 18 and the separators 22 in the slider 14, and the distance between adjacent two separators 22 is thereby extended as shown in FIG. 5, when the finally remained rolling element 18 is assembled between the separator 22, injury of the corner 22a of the separators by the rolling element 18 can be prevented.

Further, also in a case of decreasing the gap for the row of the rolling elements, since the separator 22 is not injured upon assembling the final rolling element, the separator 22 can be provided with an anti-slip off function of the rolling element.

Figure 7:
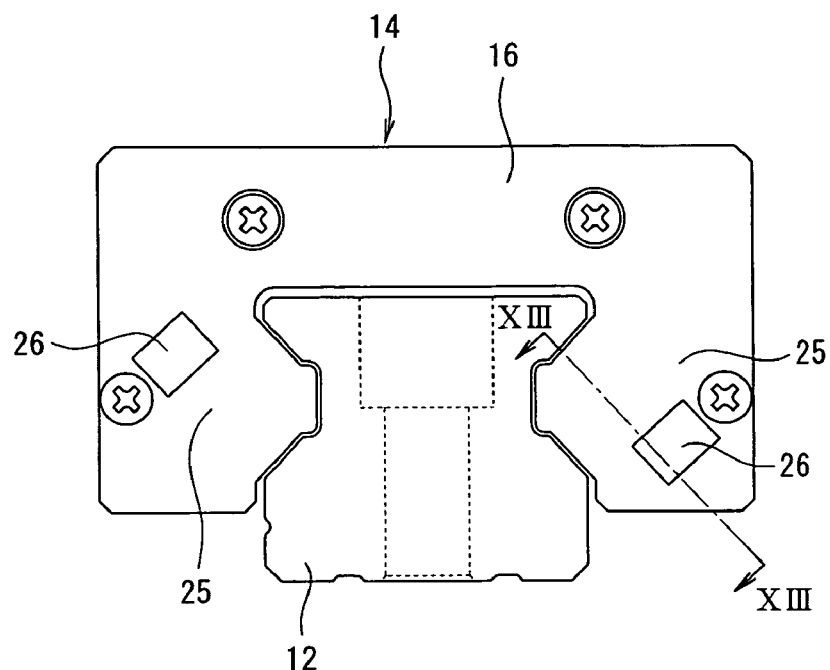
FIG. 7 is a front elevational view of a linear guide device according to a second embodiment of the invention.
Figure 8:
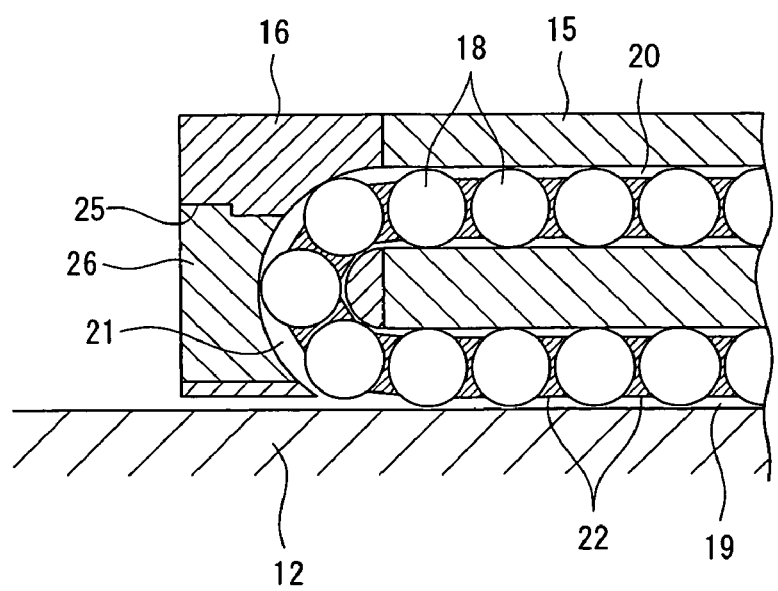
FIG. 8 is a view showing a XIII-XIII cross section of FIG. 7.

In the first embodiment described above, while the through-holes 25 for assembling the rolling elements 18 and the separators 22 in the rolling element return channels 20 are disposed to the end caps 16 so as to oppose to the rolling element return channels 20, the through-holes 25 for assembling the rolling elements 18 and the separators 22 into the rolling element return channels 20 may be disposed also to the end caps 16 so as to oppose to portions of the rolling element return channels 20 as in the second embodiment shown in FIG. 7 and FIG. 8. That is, the through-holes 25 may be formed also to a shape including a portion of the cross sectional shape of the rolling element return channel 20.

Then, a third embodiment of the invention is to be described with reference to FIG. 9 to FIG. 20.

Figure 9:
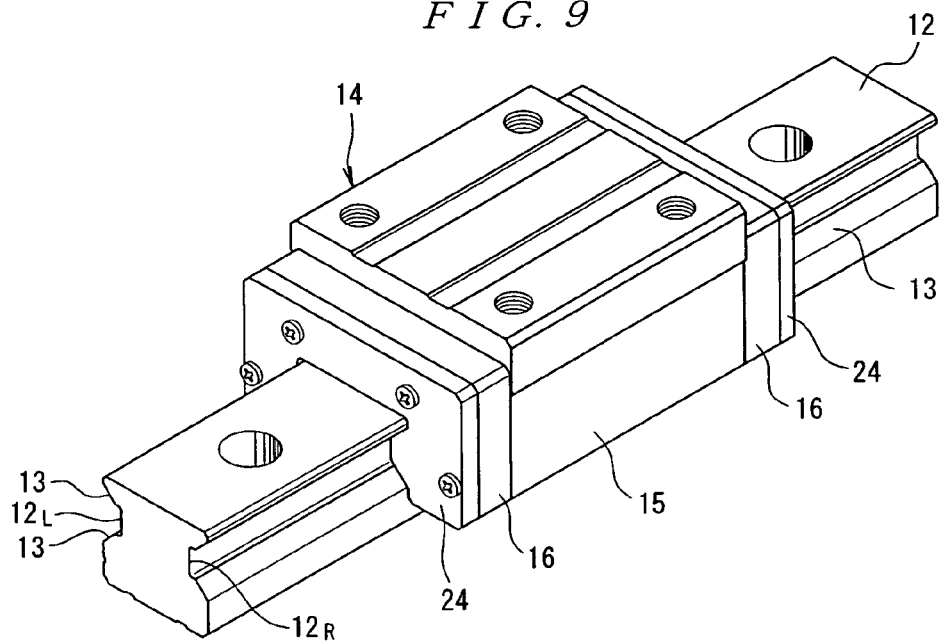
FIG. 9 is a perspective view of a linear guide device according to a third embodiment of the invention.

In FIG. 9, a linear guide device according to the third embodiment of the invention has a guide rail 12, a slider main body 15, two end caps 16, and two side seals 24.

The guide rail 12 is formed linearly, two rail side rolling element raceway surfaces 13 are formed on the left lateral surface 12L and the right lateral surface 12R of the guide rail 12 along the longitudinal direction of the guide rail 12.

Figure 10:
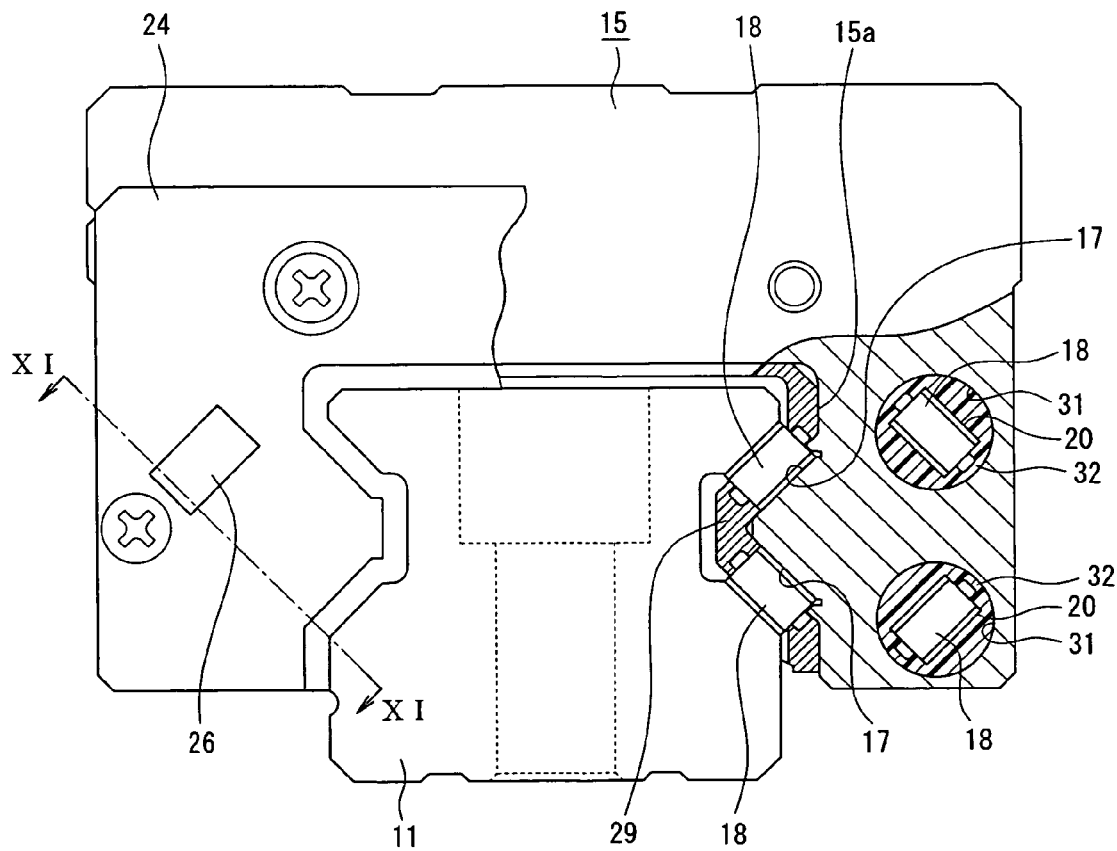
FIG. 10 is a front elevational view of the linear guide device shown in FIG. 9.

The slider main body 15, together with the two end caps 16, constitute a slider 14. Further, the slider main body 15 has two inner wall surfaces 15a (only one of them is shown in FIG. 10) opposing respectively to the left lateral surface 12L and the right lateral surface 12R of the guide rail 12, and two slider side rolling element raceway surfaces 17 are formed on the inner wall surfaces 15a.

Figure 11:
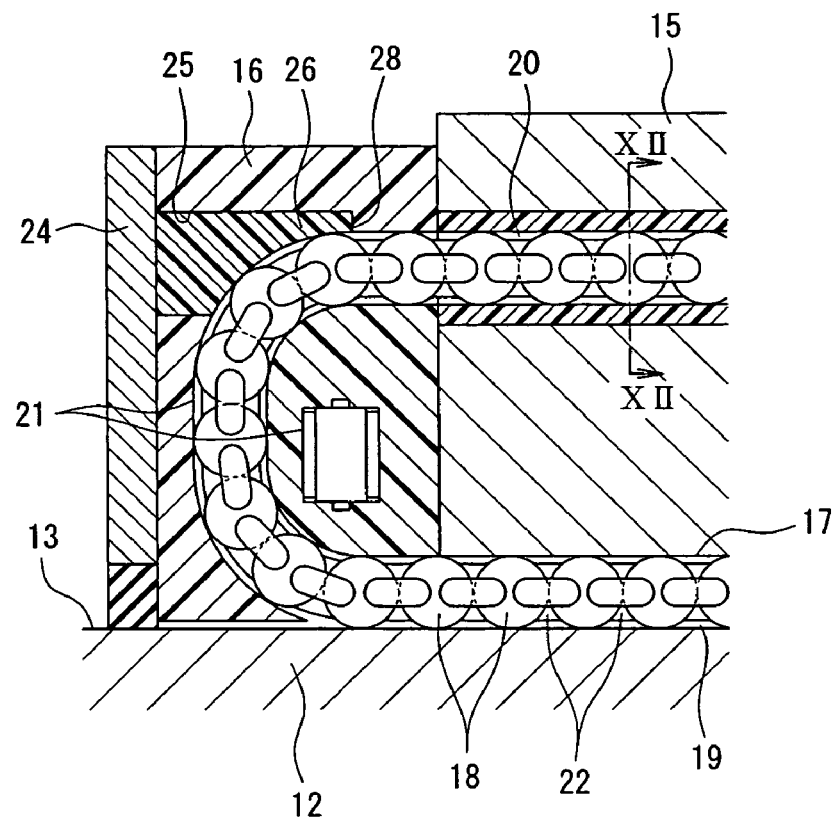
FIG. 11 is a view showing a XI-XI cross section of FIG. 10.
Figure 12:
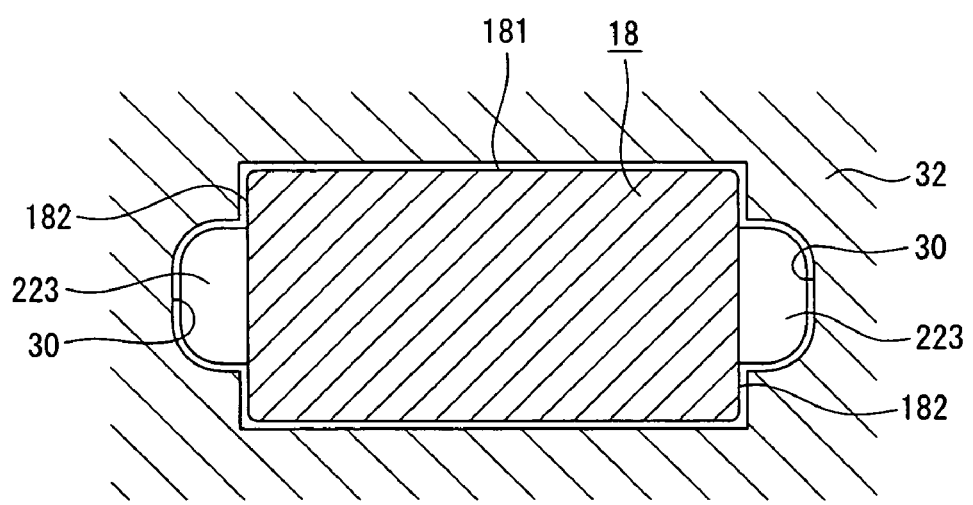
FIG. 12 is a view showing a XII-XII cross section of FIG. 11.
Figure 13:
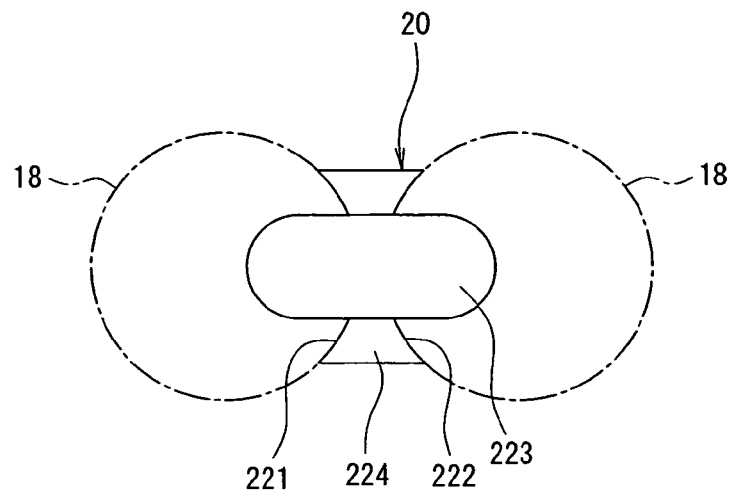
FIG. 13 is a side elevational view of the separator shown in FIG. 11.

The slider side rolling element raceway surfaces 17 oppose to the rail side rolling element raceway surfaces 13 respectively, and rolling element load rolling channels 19 for rolling the rolling elements 18 along the longitudinal direction of the guide rail 2 are formed between the rail side rolling element raceway surfaces 13 and the slider side rolling element raceway surfaces 7 as shown in FIG. 11.

In the slider main 15, four rolling element return channels 20 for returning the rolling elements 18 after rolling through the rolling element load rolling channels 19 along with a relative linear motion of a slider 14 (refer to FIG. 11) are formed along the longitudinal direction of the guide rail 12. Each of the rolling element return channels 20 is formed by perforating a through-hole 31 penetrating in the longitudinal direction of the guide rail 2 (refer to FIG. 10) in the slider main body 15 and fitting a cylinder member 32 made of a resin in the through-hole 31.

In each end cap 16 constituting, together with the slider 15, the slider 14, rolling element direction changing channels 21 in communication with the rolling element load rolling channels 19 and the rolling element return channels 20 (refer to FIG. 11) is formed. The rolling element direction changing channels 21 are curved substantially into a U-shaped configuration and, accordingly, the rolling elements 18 after rolling through the rolling element load rolling channels 19 and the rolling elements return channels 20 are switched for the direction in the rolling element direction changing channels 21.

The rolling element 18 is formed into a cylindrical shape, and a separator 22 interposed between each of the rolling elements 18 (refer to FIG. 11) is formed of a material softer than the rolling element 18 (for example, resin) in order to suppress the increase in the levels of vibrations and noises caused by collision between the rolling elements against each other.

Figure 14:
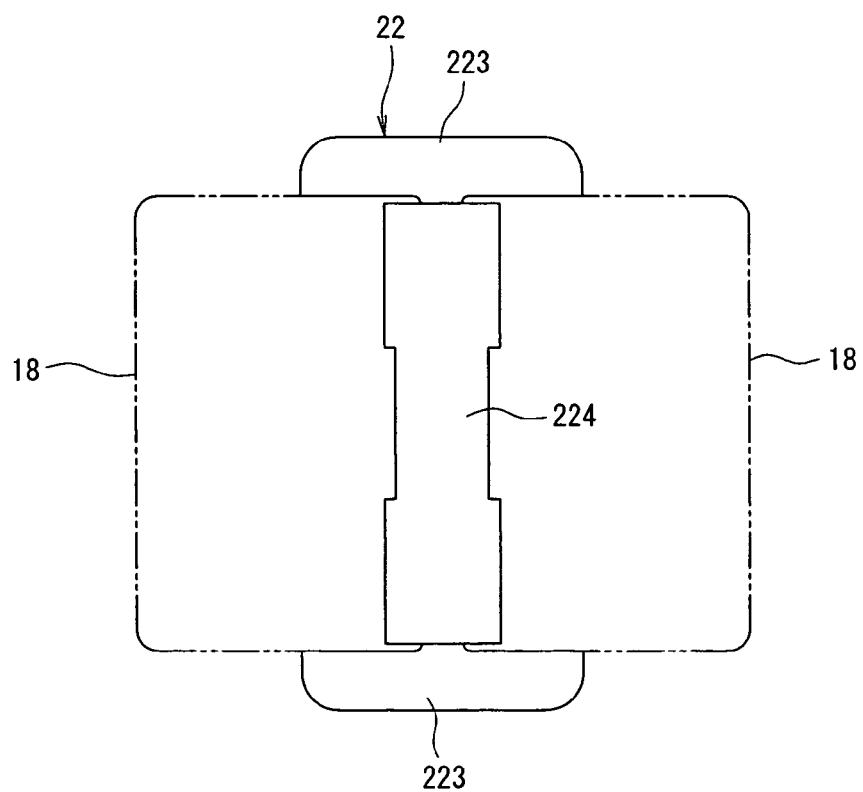
FIG. 14 is a plane view of the separator shown in FIG. 13.
Figure 15:
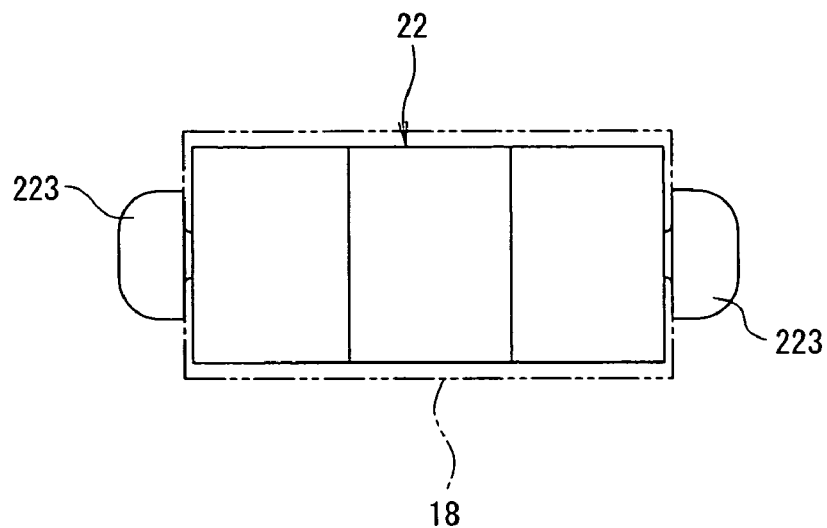
FIG. 15 is a front elevational view of the separator shown in FIG. 14.

The rolling element 18 has a cylindrical rolling surface 181 (refer to FIG. 12) that rolls on the rail side rolling element raceway surface 13 and the slider side rolling element raceway surface 17, and the separator 22 is provided with concave rolling element contact surfaces 221, 222 (refer to FIG. 13) in sliding contact with the rolling surface 181. As shown in FIG. 14 and FIG. 15, the separator 22 comprises a main body portion 224 situating between two rolling elements 18 and a pair of right and left arms 223 disposed on both sides of the main body portion 224.

The rolling elements 18 and the separators 22 are held by a cage 29 (refer to FIG. 10) disposed between the guide rail 12 and the slider main body 15.

The rolling element 18 has circular end faces 182 on both lateral ends of the rolling surface 181 (refer to FIG. 12), and guide grooves 30 slidably engaging the arms 223 of the separator 22 (refer to FIG. 12) are formed on the inner wall surface of the rolling element return channel 20 and the rolling element direction changing channel 21 opposing to the end faces 182.

Figure 16:
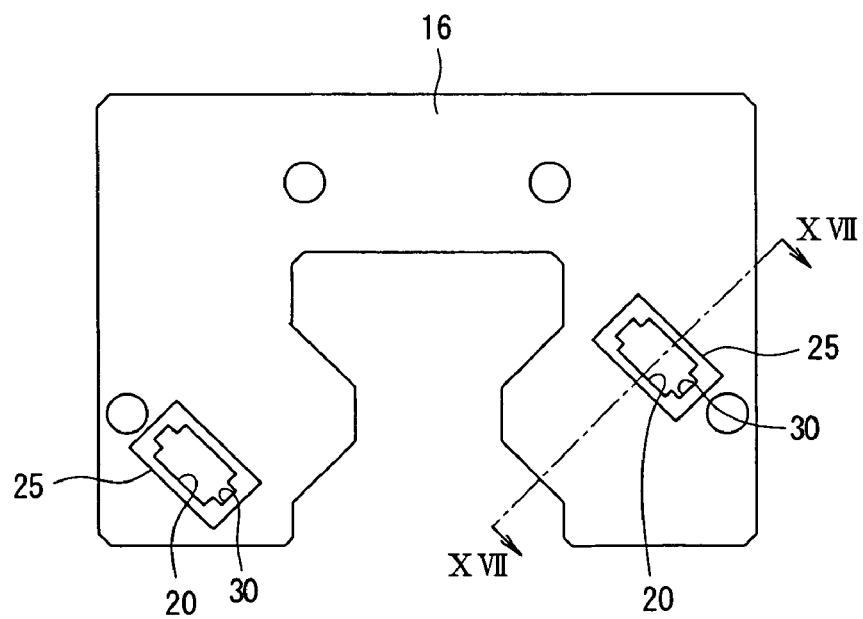
FIG. 16 is a front elevational view of the end cap shown in FIG. 9.

The end caps 16 are provided with two through-holes 25 for assembling the rolling elements 18 and the separators 22 into the rolling element return channels 20 of the slider main body 15 (refer to FIG. 16). The through-holes 25 are formed in the end caps 16 so as to oppose to the rolling element return channels 20. Further, the through-holes 25 are formed in the end caps 16 with an area opening being larger than the area of opening the rolling element return channels 20, and closed by cap members 26 of the end cap 16 (refer to FIG. 11). The cap members 26 are detachably fitted to the through-holes 25 to form portions of the rolling element direction changing channels 21 formed in the end caps 16.

The through-holes 25 have steps 27 as positioning portions for positioning the cap members 26 (refer to FIG. 17). The steps 27 are formed in the end caps 16, and the cap members 26 are provided with an engaging portion 28 for engaging the step 27 (refer to FIG. 11).

Figure 19:
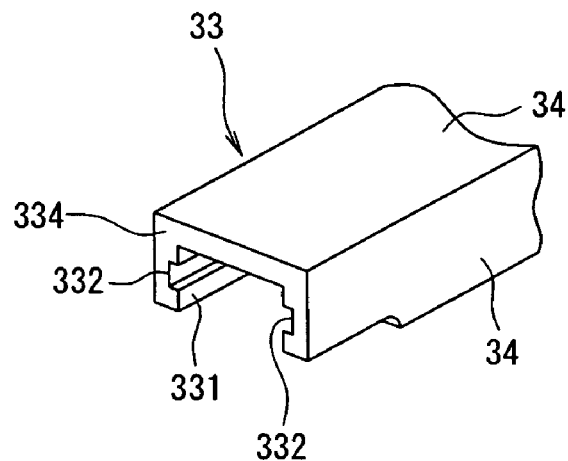
FIG. 19 is a perspective view showing an example of a rolling element insertion jig.
Figure 20:
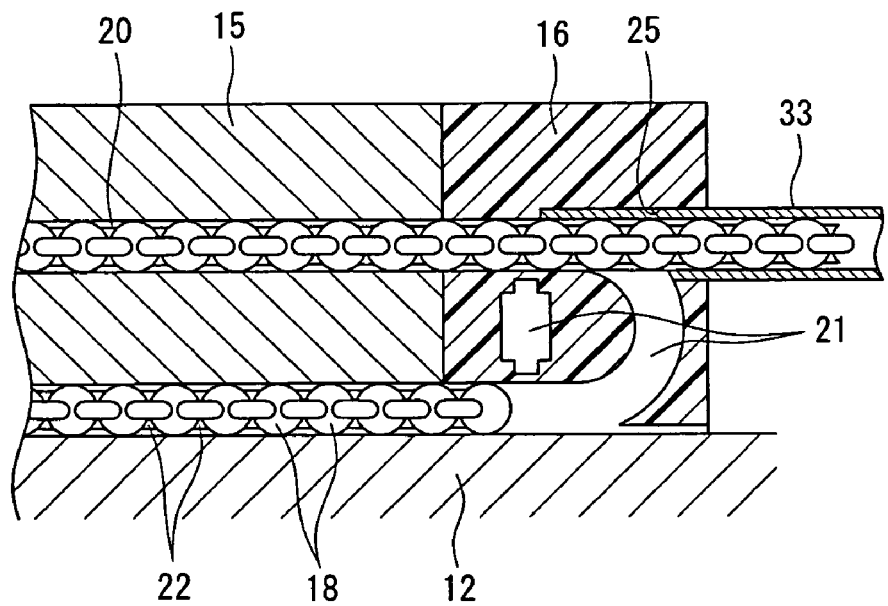
FIG. 20 is an explanatory view for explaining an assembling method in a case of assembling rolling elements and separators into a slider by using the rolling element insertion jig of FIG. 19.

FIG. 19 shows an example of a rolling element insertion jig used upon loading the rolling elements 18 and the separators 22 from the through-holes 25 formed in one of the end caps 16 to the inside of the slider 14. The rolling element insertion jig 33 is formed by combining four plate members 34 into a rectangular shape. Further, the rolling element insertion jig 33 has two inner wall surfaces 331 opposing respectively to the end faces 182 of the rolling element 18 (refer to FIG. 12), and guide grooves 332 for slidably engaging the arms 223 of the separator 22 are disposed to the inner wall surfaces 331 along the longitudinal direction of the rolling element insertion jig 33 respectively. Further, the rolling element insertion jig 33 is formed into a shape fitting to the through-hole 25, and has an engaging surface 334 for engaging the step 27 of the through-hole 25 formed at the top end thereof.

In a case of loading the rolling elements 18 and the separators 22 in the rolling element insertion jig 33, when the top end of the rolling element insertion jig 33 is inserted into the through-hole 25 till the engaging surface 334 of the rolling element insertion jig 33 abuts against the step 27 and then the rolling elements 18 and the separators 22 are loaded in the rolling element insertion jig 33, the rolling element 18 or the separator 22 can be prevented from dropping out of the opening at the top end of the rolling element insertion jig 33.

In the third embodiment of the invention constituted as described above, since the rolling elements 18 and the separators 20 can be assembled easily into the slider 14 upon assembling of the linear guide device, by disposing the through-holes 25 in the end cap 16 for assembling the rolling elements 18 and the separators 22 into the rolling element return channels 20 of the slider main body 15, the assembling property of the linear guide device can be enhanced. Further, since the rolling elements 18 and the separators 22 can be assembled into the slider 14 by using the rolling element insertion jig 33 as shown in FIG. 19, occurrence of turn down of the separator 22 in the slider 14 can be prevented. Further, since the through-holes 25 for assembling the rolling elements 18 and the separators 22 in the rolling element return channels 20 of the slider main body 15 are provided in the end caps 16 so as to oppose to the rolling element return channels 20, the rolling elements 18 and the separators 22 can be assembled into the slider 14 without requiring large force.

Then, a fourth embodiment of the invention is to be described with reference to FIG. 21 to FIG. 24, FIG. 25A to FIG. 25C, and FIG. 26A to FIG. 26C.

Figure 21:
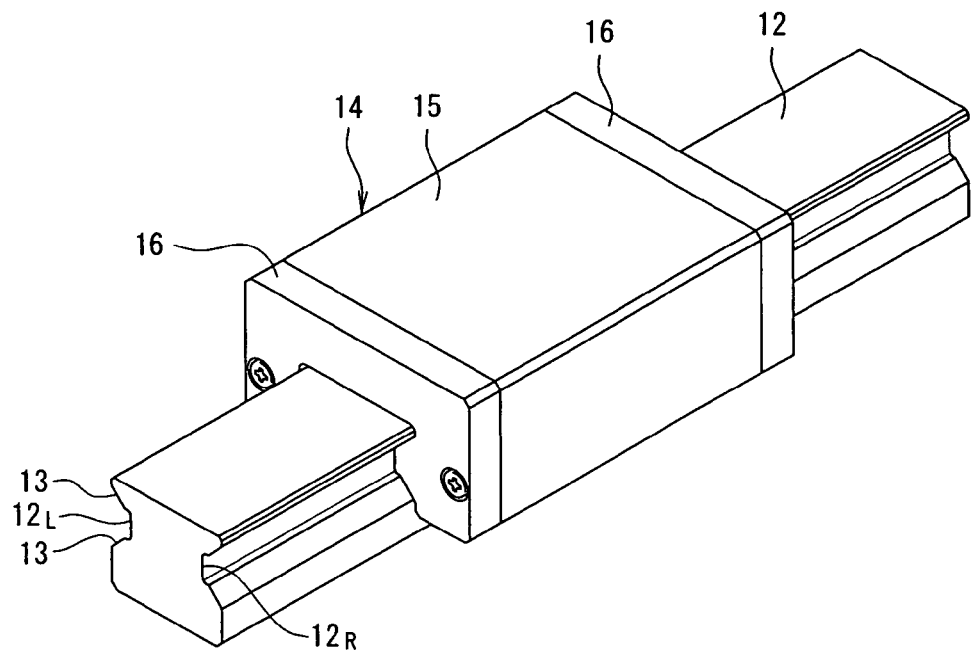
FIG. 21 is a perspective view of a linear guide device according to a fourth embodiment of the invention.
Figure 22:
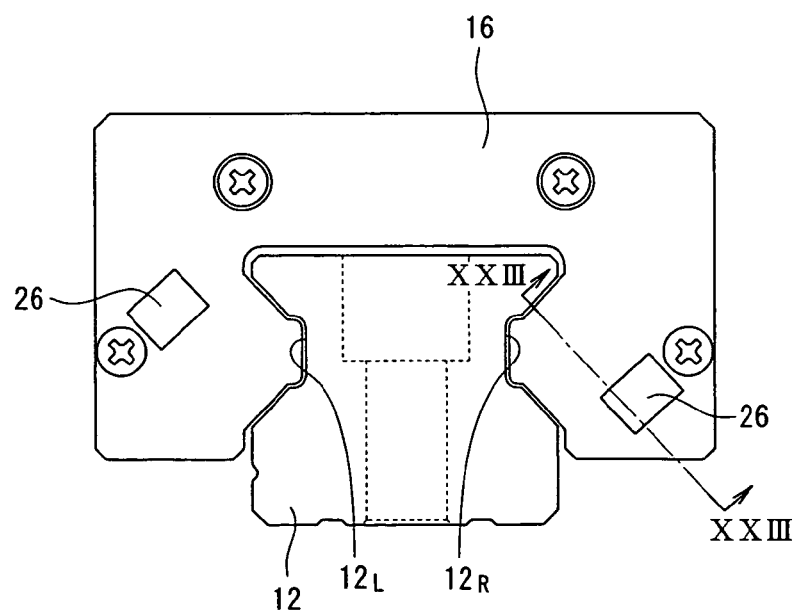
FIG. 22 is a front elevational view of the linear guide device shown in FIG. 21.

In FIG. 21, a linear guide device according to the fourth embodiment has a guide rail 12, a slider main body 15, and two end caps 16.

The guide rail 12 is formed linearly and rail side rolling element raceway surfaces 13 are formed each by two on the left lateral surface 12L and the right lateral surface 12R of the guide rail 12 along the longitudinal direction of the guide rail 12.

Figure 23:
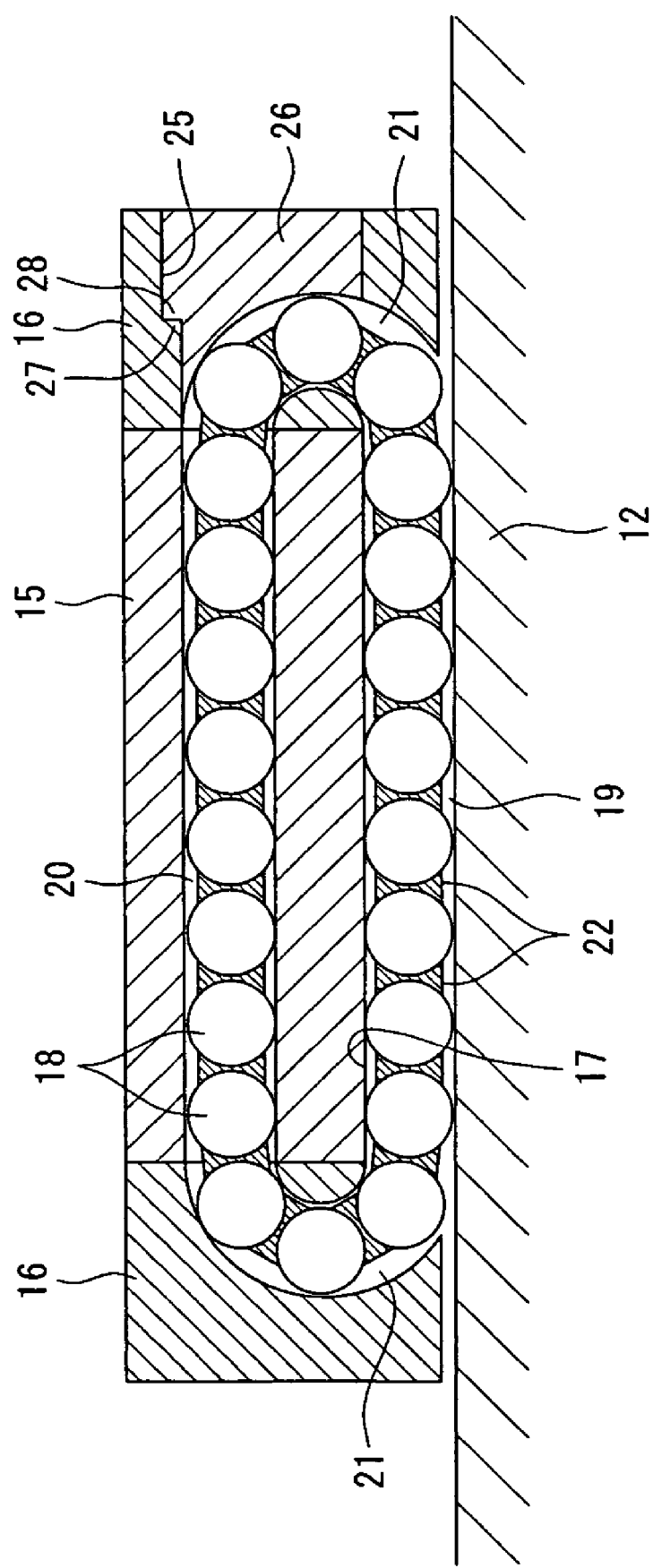
FIG. 23 is a XXIII-XXIII cross sectional view of FIG. 22.

The slider main body 15, together with two end caps 16, constitute a slider 14, and a plurality of slider side rolling element raceway surfaces 17 are formed on the slider main body 15 (only one of them is illustrated) along the longitudinal direction of the guide rail 12 as shown in FIG. 23.

The slider side rolling element raceway surfaces 17 are opposed to the rail side rolling element raceway surface 13, respectively, and rolling element load rolling channels 19 for rolling the rolling elements 18 along the longitudinal direction of the guide rail 2 are formed between the rail side rolling element raceway surfaces 13 and the slider side rolling element raceway surfaces 17 (refer to FIG. 23).

In the slider main body 15, rolling element return channels 20 for returning the rolling elements 18 after rolling through the rolling element load rolling channels 19 along with a relative linear motion of the slider 14 (refer to FIG. 23) are formed. The rolling element return channels 20 are formed in the longitudinal direction of the guide rail 2 in the slider main body 15. In each of the end caps 16 constituting the slider 14 together with the slider main body 15, rolling element direction changing channels 21 in communication with the rolling element load rolling channels 19 and the rolling element return channels 20 (refer to FIG. 23) are formed. The rolling element direction return channels 21 are curved substantially in a U-shaped configuration and, accordingly, the rolling elements 18 after rolling the rolling element load rolling channels 19 and the rolling element return channels 20 respectively are switched for the direction by the rolling element direction changing channels 21.

The rolling element 18 is formed into a cylindrical shape, and a separator 22 interposed between each of the rolling elements 18 (refer to FIG. 23 is formed of a material softer than the rolling element 18 (for example, resin) in order to suppress the increase in the levels of vibrations and noises caused by collision between the rolling elements against each other.

The rolling elements 18 and the separators 22 are assembled from through-holes 25 formed in the end caps 16 (refer to FIG. 22 and FIG. 23) into the slider 14. The through-holes 25 are formed in the end caps 16 so as to oppose to the rolling element return channels 20. Further, the through-holes 25 are formed in the end caps 16 with an area of opening being larger than the area of opening of the rolling element return channels 20.

Cap members 26 for closing the through-holes 25 are disposed detachably to the end caps 16. The cap members 26 are fitted in the through-holes 25 to form portions of the rolling element direction changing channels 21 formed in the end caps 16.

The end cap 16 has steps 27 as positioning portions for positioning the cap members 26 (refer to FIG. 23). Each of the steps 27 is formed by fabricating the inner surface of the through-holes 25 stepwise, and the cap members 26 are provided with an engaging portion 28 for engaging one of the steps 27.

FIG. 25A to FIG. 25C and FIG. 26A to FIG. 26C show an example of a rolling element insertion jig used upon loading the rolling elements 18 and the separators 22 into the slider 14 from the through-holes 25 formed in the end caps 16. The rolling element insertion jig 33 includes a jig main body 35 for rotatably containing the rolling elements 18 and the separators 22, and a lid 36 covering the upper surface of the jig main body 35.

As shown in FIG. 25A to FIG. 25C, the jig main body 35 includes a main body portion 351 and a groove portion 352 formed above the main body portion 351 and rotatably containing the rolling elements 18.

The groove 352 of the jig main body 35 has a floor portion 352a and side walls portions 352b, 352b, and a guide portion 352c for guiding arm portions 223 of the separator 22 is formed to the side wall portions 352b, 352b.

Figure 26A:
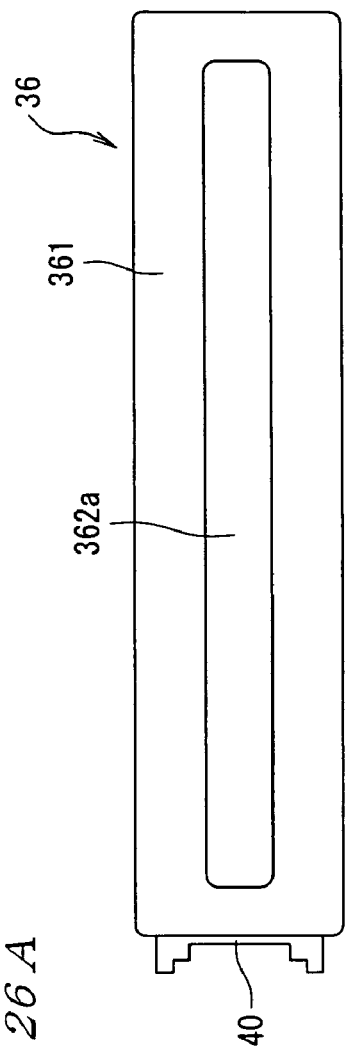
Figure 26B:
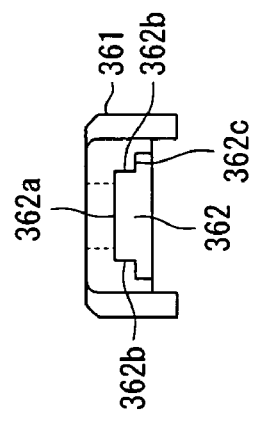
Figure 26C:
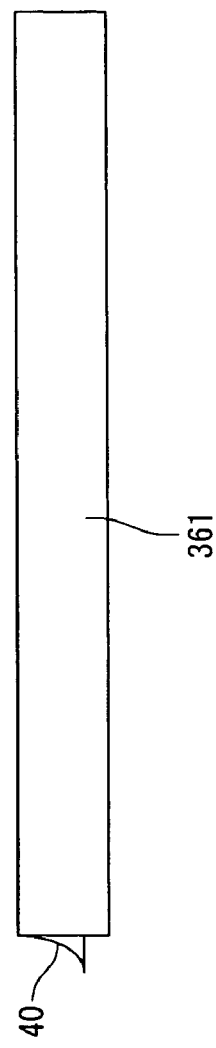
Figure 28:
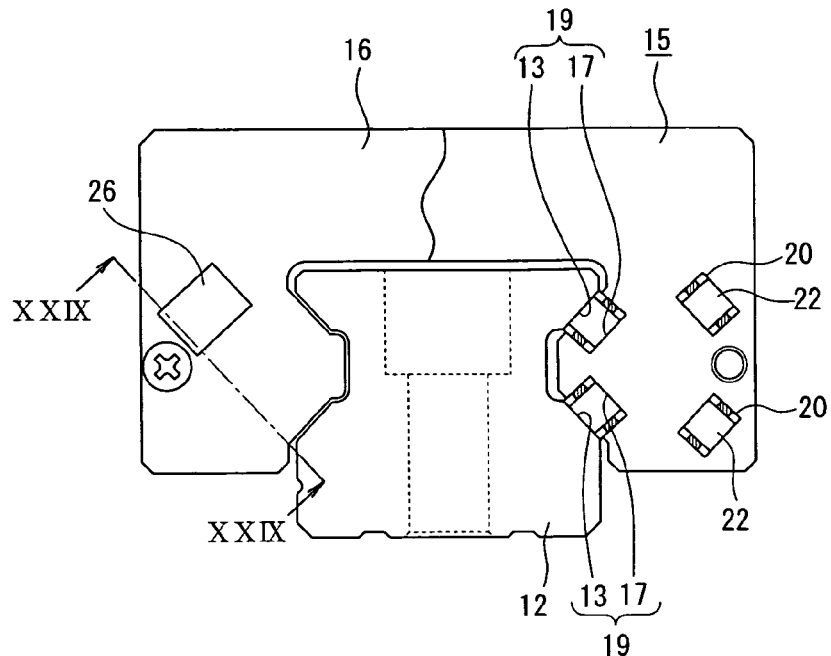
FIG. 28 is a front elevational view of the linear guide device shown in FIG. 27.

On the other hand, the lid 36 includes, as shown in FIG. 26A to FIG. 26C, a main body 361, and a groove portion 362 formed in the main body 361 for rotatably guiding the rolling elements 18.

The groove portion 362 of the lid 36 has a ceiling 362a and side wall portions 362b, 362b, and guide portions 362c for guiding the arms 223 of the separator 22 are formed to the side wall portions 362b, 362b in the same manner as in the jig main body 35. A positioning portion 40 is protruded to the top end of the jig main body 35 and the lid 36 for positioning the top end of the rolling element insertion jig 33 relative to the through-hole 25 in the end cap 16 to a predetermined position.

Upon putting the lid 36 over the jig main body 35, the rolling element insertion jig 33 shown in FIG. 24 is constituted and it is desirable that the cross section constituted with the groove portions 352, 362 has, basically, the same shape as that of the rolling element load rolling channel 19 or the rolling element return channel 20 with the length being larger than the entire length of the rolling element return channel 20. Further, as shown in FIG. 24, an opening portion 38 for penetrating a push-out member 37 for pushing out the rolling element 18 is formed to the lid 36 of the rolling element insertion jig 33, and a space portion 39 for pushing the rolling element 18 is formed between the jig main body 35 and the lid 36. While the jig main body 35 and the lid 36 are preferably formed of an inexpensive resin molding product, they may be made of a metal.

In a case of assembling the rolling elements 18 and the separators 22 into the slider 14 by using the rolling element insertion jig 35 described above, the rolling elements 18 and the separators 22 are at first arranged alternately in the groove portion 352 of the jig main body 35. Then, the upper surface of the jig main body 35 is covered with the lid 36, and the rolling element insertion jig 33 is inserted into the through-hole 25 in the end cap 16 till the top end of the positioning portion 40 abuts against the return guide 161 of the end cap 16 (refer to FIG. 24). Then, when the top end of the positioning portion 40 abuts against the return guide 161 of the end cap 16, the rolling elements 18 and the separators 22 contained in the rolling element insertion jig 33 are pushed out forward by a push-out member 37 to assemble the rolling elements 18 and the separators 22 from the through-hole 25 into the slider 14. After completing the operation of assembling the rolling elements 18 and the separators 22, the through-hole 25 is closed by the cap member 26.

With the constitution described above, since the rolling elements 18 and the separators 22 can be assembled directly on the side of the end cap in the slider 14, the arranging step can be conducted automatically and at high speed. Further, since the rolling element 18 and the separators 22 can be previously assembled in the slider 14 in a state arranged alternately, and it does not take much time and labor for the assembling of the linear guide device, the assembling operation can be conducted efficiently, automatically and accurately.

Then, a fifth embodiment of the invention is to be described with reference to FIG. 27 to FIG. 30, FIG. 31A to FIG. 31C, and FIG. 32A to FIG. 32C.

In FIG. 27, a linear guide device according to the fifth embodiment of the invention has a guide rail 12, a slider main body 15, and two end caps 16.

The guide rail 12 is formed linearly and rail side rolling element raceway surfaces 13 are formed each by two on the left lateral surface 12L and the right lateral surface 12R of the guide rail 12 along the longitudinal direction of the guide rail 12.

The slider main body 15, together with two end caps 16, constitute a slider 14, and a plurality of slider side rolling element raceway surfaces 17 are formed on the slider main body 15 (refer to FIG. 28) along the longitudinal direction of the guide rail.

Figure 29:
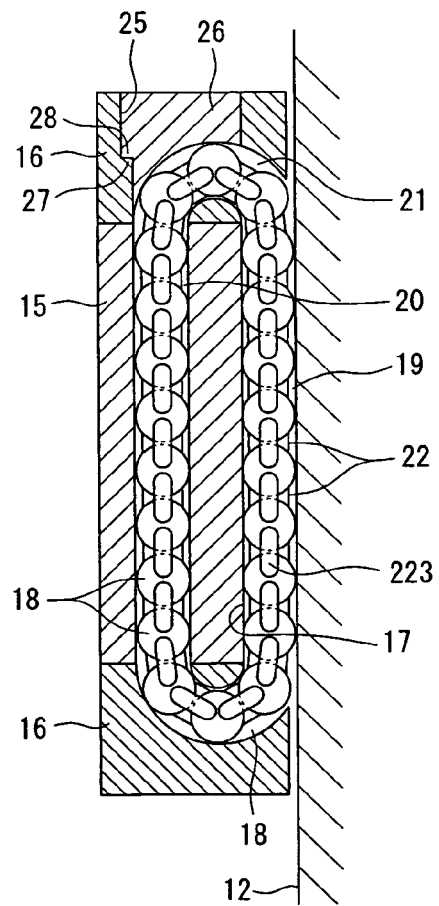
FIG. 29 is a XXIX-XXIX cross sectional view of FIG. 27.

The slider side rolling element raceway surfaces 17 are opposed to the rail side rolling element raceway surface 13, respectively, and rolling element load rolling channels 19 for rolling the rolling elements 18 along the longitudinal direction of the guide rail 2 are formed between the rail side rolling element raceway surfaces 13 and the slider side rolling element raceway surfaces 17 (refer to FIG. 29).

In the slider main body 15, rolling element return channels 20 for returning the rolling elements 18 after rolling through the rolling element load rolling channel 19 along with a relative linear motion of the slider 14 are formed along the longitudinal direction of the guide rail 12 (refer to FIG. 29). The rolling element return channel 20 is formed by perforating a through-hole 25 penetrating in the longitudinal direction of the guide rail 2 (refer to FIG. 34) in the slider main body 15 and fitting a cylindrical member 32 made of a resin in the through-hole 25.

In each end cap 16 constituting, together with the slider main body 15, the slider 14, rolling element direction changing channels 21 in communication with the rolling element load rolling channels 19 and the rolling element return channels 20 are formed (refer to FIG. 29). The rolling element direction changing channels 21 are curved substantially into a U-shaped configuration and, accordingly, the rolling elements 18 after rolling through the rolling element load rolling channels 19 and the rolling elements return channels 20 are switched for the direction in the rolling element direction changing channels 21.

The rolling element 18 is formed into a cylindrical shape, and a separator 22 interposed between each of the rolling elements 18 (refer to FIG. 29) is formed of a material softer than the rolling element 18 (for example, resin) in order to suppress the increase in the levels of vibrations and noises caused by collision between the rolling elements against each other.

The end cap 16 is provided with through-holes 25 for assembling the rolling elements 18 and the separators 22 into the rolling element return channel 20 of the slider main body 15 so as to oppose to the rolling element return channel 20 (refer to FIG. 29).

The through-holes 25 are formed in the end cap 16 with the area of opening being larger than the area of opening of the rolling element return channels 20, and cap members 26 for closing the through-hole 25 are detachably disposed to the end cap 16. The cap members 26 are fitted in the through-holes 25 to form portions of the rolling element direction changing channels 21 formed in the end cap 16.

The end cap 16 has steps 27 as positioning portions for positioning the cap members 26 (refer to FIG. 29). The steps 27 are formed by fabricating the inner surface of the through-holes 25 stepwise, and the cap members 26 are provided with an engaging portion 28 for engaging the step 27 (refer to FIG. 29).

FIG. 30, FIG. 31A to FIG. 31C, and FIG. 32A to FIG. 32C show an example of a rolling element insertion jig used upon loading the rolling elements 18 and the separators 22 from the through-hole 25 formed in the end cap 16. The rolling element insertion jig 33 includes a jig main body 35 rotatably containing the rolling elements 18 and the separators 22, and a lid 36 covering the upper surface of the jig main body 35.

As shown in FIG. 31A to FIG. 31C, the jig main body 35 includes a main body portion 351 and a groove potion 352 formed above the main body portion 351 and rotatably containing the rolling elements 18.

The groove portion 352 of the jig main body 35 has a floor portion 352a and side walls portions 352b, 352b, and guide portion 352c for guiding the arm portion 223 of the separator 22 is formed to the side wall portions 352b, 352b.

Figure 32A:
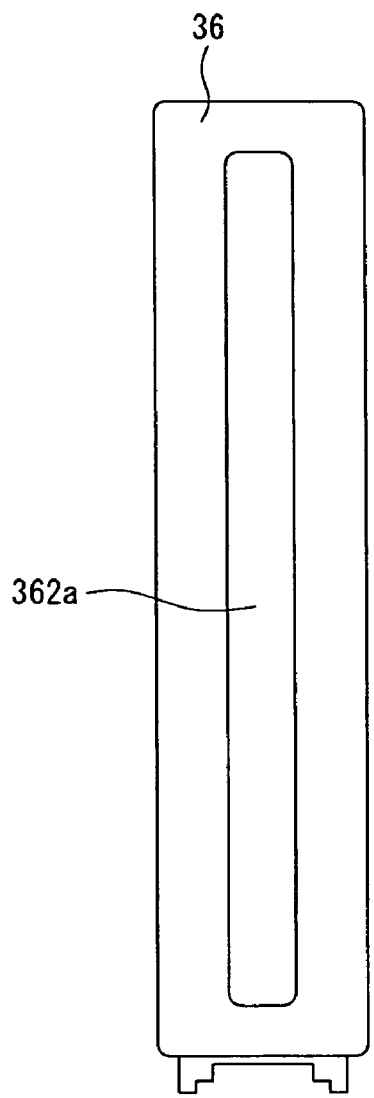
Figure 32B:
Figure 32C:
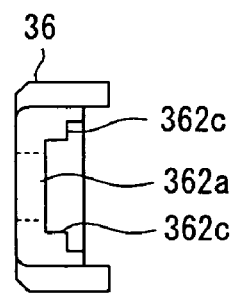

On the other hand, the lid 36 has, as shown in FIG. 32A to FIG. 32C, a main body 361, and a groove portion 362 formed in the main body 361 for rotatably guiding the rolling elements 18.

The groove portion 362 of the lid 36 has a ceiling portion 362a and side wall portions 362b, 362b, and a guide portion 362c for guiding the arm portion 223 of the separator 22 is formed to the side wall portions 362b, 362b in the same manner as in the jig main body 35.

A positioning portion 40 is protruded to the top end of the jig main body 35 and the lid 36 for positioning the top end of the rolling element insertion jig 33 relative to the through-hole 25 in the end cap 16 to a predetermined position.

Figure 30:
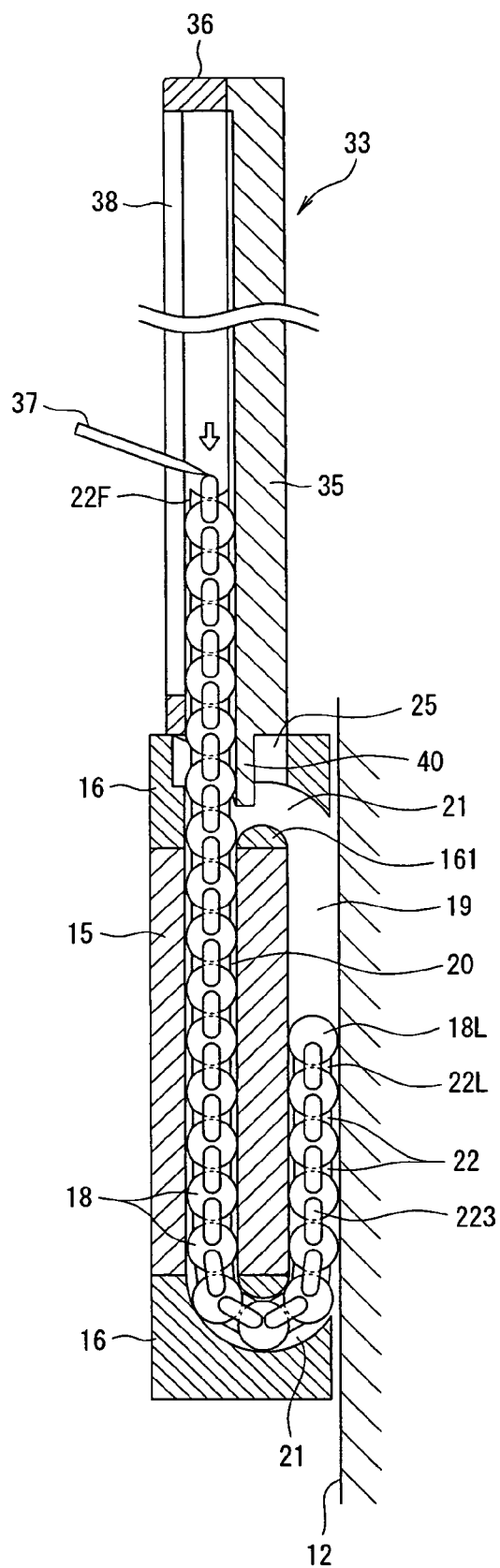
FIG. 30 is a view showing an example of a rolling element insertion jig.

Upon putting the lid 36 over the jig main body 35, the rolling element insertion jig 33 shown in FIG. 30 is constituted and it is desirable that the cross section constituted with the groove portions 352, 362 has, basically, the same shape as that of the rolling element load rolling channel 19 or the rolling element return channel 20 with the length being larger than the entire length of the rolling element return channel 20. Further, as shown in FIG. 30, an opening portion 38 for penetrating a push-out member 37 for pushing out the rolling element 18 is formed to the lid 36 of the rolling element insertion jig 33, and a space portion 39 for pushing the rolling element 18 is formed between the jig main body 35 and the lid 36. While the jig main body 35 and the lid 36 are preferably formed of an inexpensive resin molding product, they may be made of a metal.

In a case of assembling the rolling elements 18 and the separators 22 into the slider 14 by using the rolling element insertion jig 35 described above, the rolling elements 18 and the separators 22 are at first arranged alternately in the groove portion 352 of the jig main body 35. Then, the upper surface of the jig main body 35 is covered with the lid 36 and the rolling element insertion jig 33 is inserted into the through-hole 25 in the end cap 16. Then, the rolling elements 18 and the separators 22 contained in the rolling element insertion jig 33 are pushed out in the direction of an arrow in the drawing by the push-out member 37.

When the row of rolling elements is pushed out by a push-out member 37, the top rolling element 18L is at first pushed out by way of the rolling element return channel 20 and the rolling element direction changing channel 21 to the rolling element load rolling channel 19 and, successively, a separator 22L adjacent with the rolling element 18L is pushed out in the rolling element load rolling channel 19. Further, also the succeeding rolling elements 18 and the separators 22 are also pushed out into the load rolling channel 19. In this case, since the separator 22L is guided by the top rolling element 18L and also pushed by the succeeding rolling element 18 and the separator 22, the separator 22 can be prevented from tilting or turning down in the rolling element load rolling channel 19. Further, since the positioning portion 40 formed to the jig main body 35 is on the side of the load rolling channel 19, the rolling elements 18 and the separators 22 are not loaded directly to the direction changing channel 21 but are assembled to the rolling element return channel 20 directly. Further, when the rolling element 22L precedes in the rolling element load rolling channel 19, since the rolling element 18L is hindered from advancing by the positioning portion, it is not in contact with the succeeding rolling element 18 and the separator 22 and insertion of the rolling element row is not hindered.

After the pushing out the final separator 22F into the rolling element load rolling channel 19, the top end of the rolling element insertion jig 33 is withdrawn from the through-hole 25, and the through-hole 25 is closed by the cap member 26 to complete the operation of loading the rolling elements 18 and the separators 22 in the slider 14.

Therefore, according to this embodiment, since the rolling elements 18 and the separators 22 can be assembled from the through-hole 25 formed in the end cap 16 into the slider 14, the operation of loading the rolling elements 18 and the separators 22 into the slider 14 is facilitated making it possible for automatic and high speed operation for the step of the assembling operation of the linear guide device.

Further, since the separator 22L adjacent with the leading rolling element 18L is pushed by the succeeding rolling element 18 and the separator 22 and guided by the top rolling element 18L, succeeding rolling elements 18 and the separators 22 are assembled smoothly in the slider 14 making it possible for automatic and high speed operation for the step of assembling operation of the linear guide device.

Further, in this embodiment, since the rolling elements 18 and the separators 22 can be previously arranged in the rolling element insertion jig 33 before loading the rolling elements 18 and the separators 22 in the slider 14, the operation of loading the rolling elements 18 and the separator 22 into the slider 14 can be conducted rapidly making it possible for high speed assembling operation step of the linear guide device.

In this embodiment, while the rolling elements 18 and the separators 22 arranged in the rolling element insertion jig 33 are pushed out from the rolling element insertion jig 33 by the push-out member 37, the rolling elements 18 and the separators 22 may also be pushed out from the inside of the rolling element insertion jig 33 by using a tool such as tweezers, or may be manually pushed out from the inside of the rolling element insertion jig 33 without using the tool.

Alternatively, an opening may be formed to the surface on the side opposite to the top end of the rolling element insertion jig 33 and the rolling elements 18 and the separator 22 may be pushed out from the inside of the rolling element insertion jig 33 through the opening by using a rod-like member or the like.

Then, a sixth embodiment of the invention is to be described with reference to FIG. 33 to FIG. 39.

Figure 33:
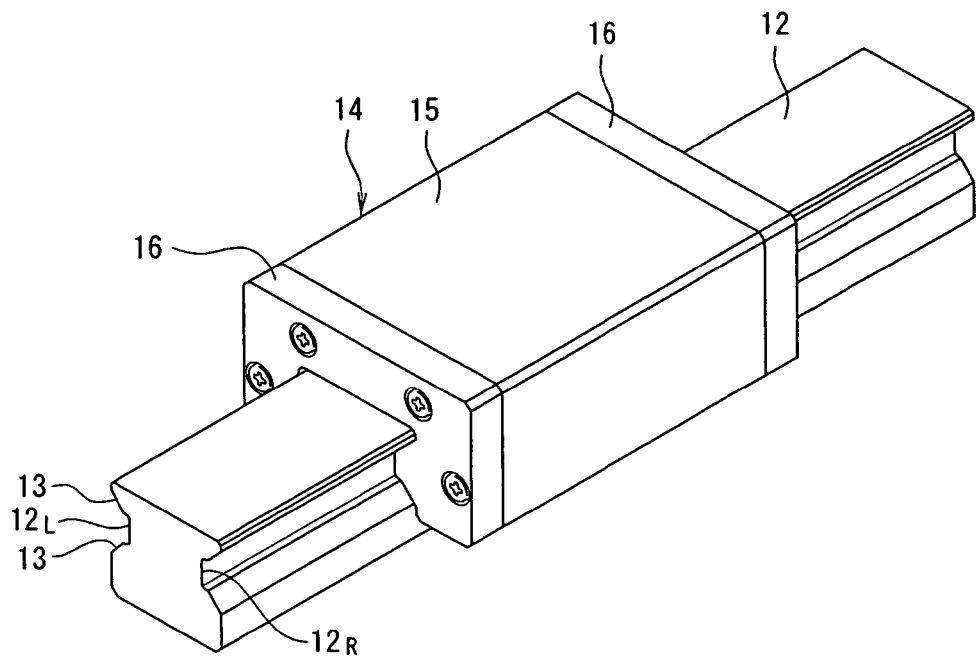
FIG. 33 is a perspective view of a linear guide device according to a sixth embodiment of the invention.

In FIG. 33, a linear guide device according to the sixth embodiment has a guide rail 12, a slider main body 15, and two end caps 16.

The guide rail 12 is formed linearly two rail side rolling element raceway surfaces 13 are formed each by two on the left lateral surface 12L and the right lateral surface 12R of the guide rail 12 along the longitudinal direction of the guide rail 12.

The slider side rolling element raceway surfaces 17 are opposed to the rail side rolling element raceway surface 13, respectively, and rolling element load rolling channels 19 for rolling the rolling elements 18 along the longitudinal direction of the guide rail 2 are formed between the rail side rolling element raceway surfaces 13 and the slider side rolling element raceway surfaces 17.

Figure 41:
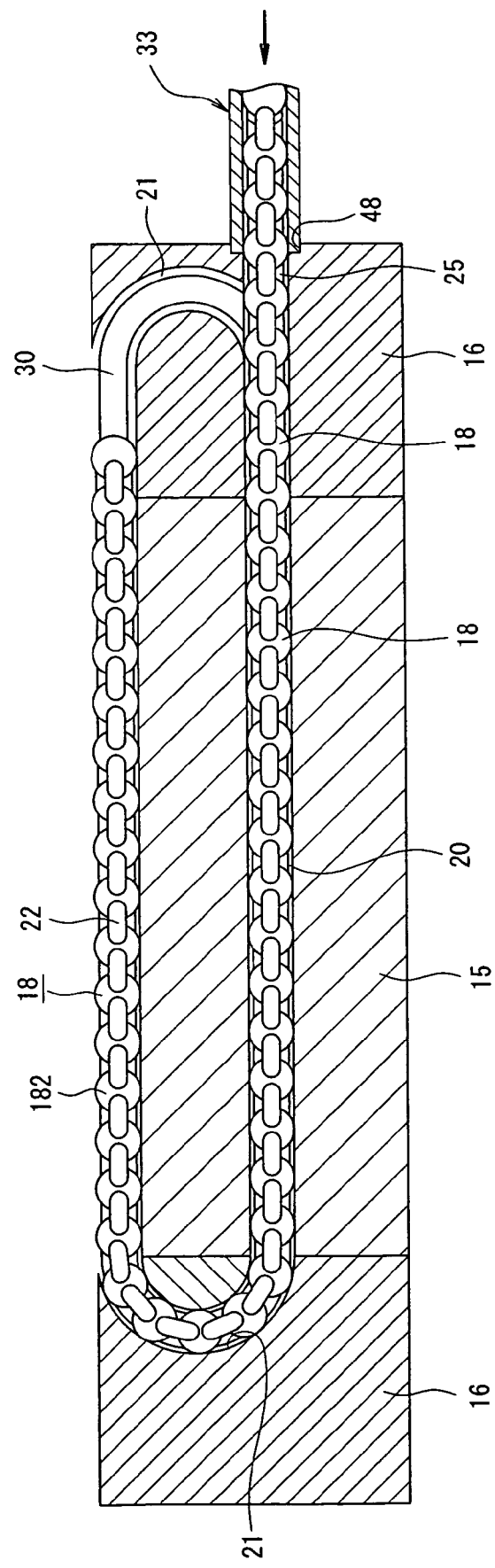
FIG. 41 is an explanatory view for explaining a method of loading rolling elements and separators by using the rolling element insertion jig shown in FIG. 39.

In the slider main body 15, rolling element return surfaces 20 for returning the rolling elements 18 after rolling the rolling element load rolling surfaces 19 along with a relative linear motion of the slider 14 are formed (refer to FIG. 41). The rolling element return channels 20 are formed in the longitudinal direction of the guide rail 2 in the slider main body 15. In each of the end caps 16 constituting the slider 14 together with the slider main body 15, rolling element direction changing channels 21 in communication with the rolling element load rolling channels 19 and the rolling element return channels 20 are formed (refer to FIG. 41). The rolling element direction return channels 21 are curved substantially in a U-shaped configuration and, accordingly, the rolling elements 18 after rolling through the rolling element load rolling channels 19 and the rolling element return channels 20 respectively are switched for the direction by the rolling element direction changing channels 21.

The rolling element 18 is formed into a cylindrical shape, and a separator 22 interposed between each of the rolling elements 18 (refer to FIG. 41) is formed of a material softer than the rolling element 18 (for example, resin) in order to suppress the increase in the levels of vibrations and noises caused by collision between the rolling elements against each other. Further, the rolling element 18 has a rolling surface 181 (refer to FIG. 41) that rolls on the rail side rolling element raceway surface 17 and the slider side rolling element raceway surface 17, the separator 22 is provided with an arcuate rolling element contact surfaces 221, 222 (refer to FIG. 41) in sliding contact with the rolling surface 181 (refer to FIG. 37), and provided with a pair of right and left arm portions 223 for suppressing the axial movement of the rolling element 18.

Figure 34:
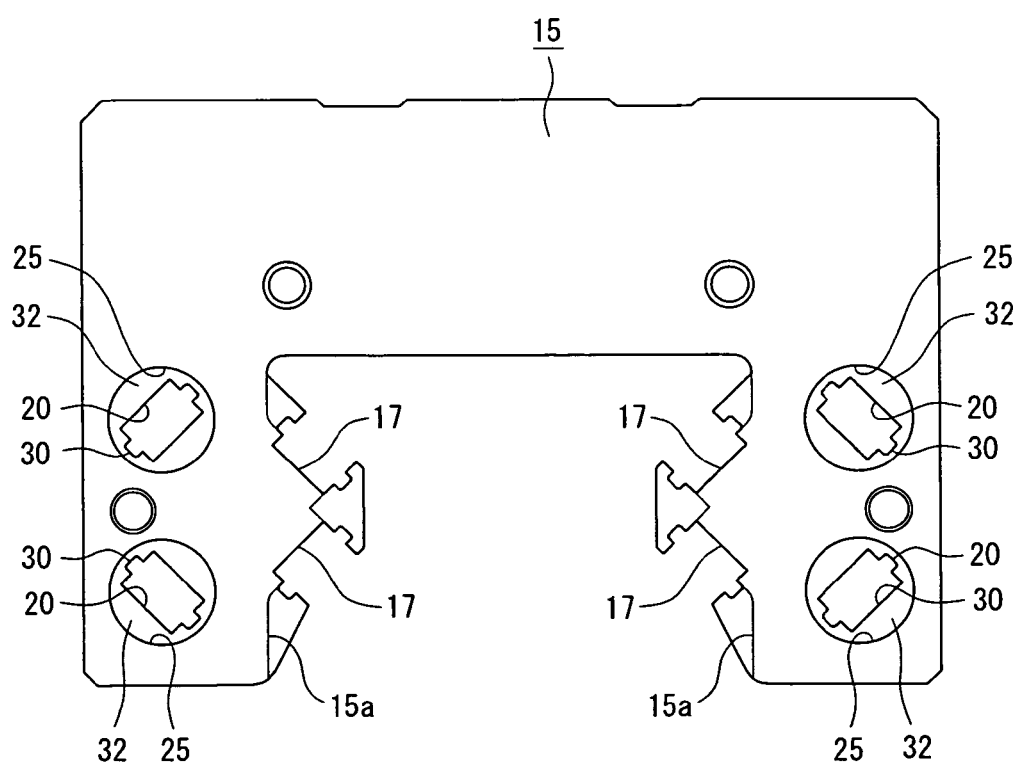
FIG. 34 is a front elevational view of a slider main body shown in FIG. 33.

The rolling element return channel 20 and the rolling element direction changing channel 21 each has a rectangular shape in the cross section perpendicular to the longitudinal direction, and a guide groove 30 slidably engaging the arm portion 223 of the separator 22 is formed on the inner wall surface of the rolling element return channel 20 and the rolling element direction changing channel 21 (refer to FIG. 34). The end cap 16 is provided with a through-hole 25 for incorporating the rolling elements 18 and the separators 22 in the rolling element return channel 20 of the slider main body 15 (refer to FIG. 35A, FIG. 35B and FIG. 36). Through-holes 25 are formed in the end cap 16 coaxially with an extension line L1 extended from the center line of the rolling element return channel 20. Further, the through-holes 25 have two inner wall surfaces 251 (refer to FIGS. 35A and 35B) opposing to the end faces 182 of the rolling element 18 (refer to FIG. 41) respectively, and guide grooves 45 slidably engaging the arm portions 223 of the separator 22 are formed to the inner wall surfaces 251. Further, the through-holes 25 are formed in the end cap 16 with an area of opening substantially equal with the area of opening of the rolling element return channel 20, and cap members 26 for closing the through-holes 25 (refer to FIG. 38A to FIG. 38D, and FIG. 43) are disposed detachably to the end cap 16.

The cap members 26 fit in the through-holes 25 to form portions of the rolling element direction changing channel 21 formed in the end cap 16.

Figure 39:
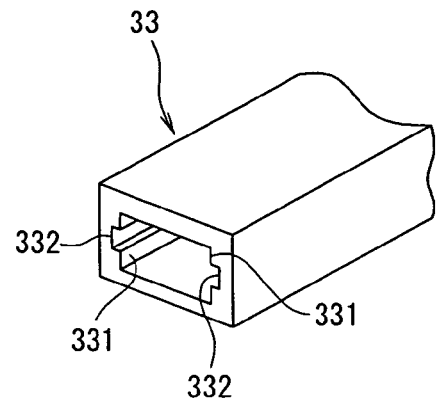
FIG. 39 is a perspective view of a rolling element insertion jig used upon loading rolling elements and separators in a slider of the linear guide device shown in FIG. 33.

The through-holes 25 open at the end face 162 of the end cap 16 on the side opposite to the slider main body 15 (refer to FIG. 36), and holes 48 are formed as positioning portions to the end face 162 of the end cap 16 that engages the top end of the rolling element insertion jig 33 shown in FIG. 39 to position the rolling element insertion jig 33 and position the cap members 26. The hole 48 is formed into a rectangular shape coaxially with the through-hole 25 and at a size slightly larger than the through-hole 25, and the cap member 26 is provided with an engaging portion 28 (refer to FIG. 38A to FIG. 38D) engaging the hole 48.

The cap member 26 is made of an elastic material such as rubber or plastics and the cap member 26 is provided with a convex portion 26b (refer to FIG. 38A to FIG. 38D) fitting in the guide groove 45 of the through-hole 25.

Then, the rolling element insertion jig 33 used in this embodiment is to be described with reference to FIG. 39. The rolling element insertion jig 33 is a rectangular tubular body having a cross section of the same planar shape as that of the step 27 and the inner cross sectional shape is identical with the cross sectional shape of the through-hole 25. The rolling elements insertion jig 33 has two inner wall surfaces 331 (refer to FIG. 39) opposing respectively to the end faces of the rolling element 18, and guide grooves 332 slidably engaging the arm portions 223 of the separator 22 are disposed respectively along the longitudinal direction of the rolling element insertion jig 33.

The length of the rolling element insertion jig 33 is set to a length by the number of rolling element that can be inserted in the slider 14.

Then, the assembling method of the linear guide device is to be described with reference to FIG. 40 to FIG. 43.

Figure 40:
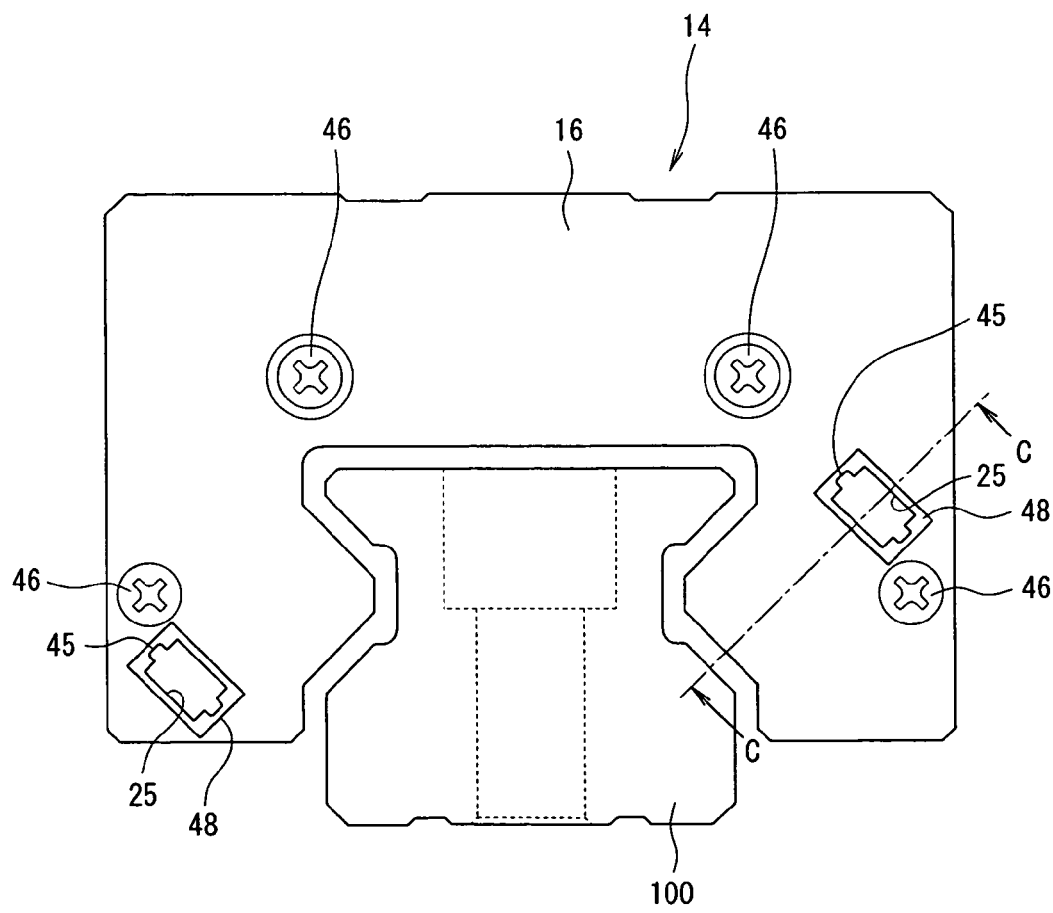
FIG. 40 is a front elevational view of the linear guide device shown in FIG. 33.

The slider 14 is assembled by at first by fixing one end cap 16 to one end and the other end cap 16 to the other end of the slider main body 15 by means of bolts 46 respectively. Then, the slider 14 is attached to the guide rail 12. In this case, the through-hole 25 of the end cap 16 is not closed by the cap member 26 but the open end of the through-hole 25 is exposed as shown in FIG. 40.

Then, the rolling elements 18 and the separators 22 are assembled from the through-hole 25 into the slider 14 by using the rolling element insertion jig 33 shown in FIG. 39. Specifically, after assembling at first a plurality of rolling elements 18 and separators 12 alternately into the rolling element insertion jig 33, one longitudinal end of the rolling element insertion jig 33 is fitted into the through-hole 25 formed in the end cap 16. Then, as shown in FIG. 41, a plurality of the rolling elements 18 and the separators 22 are pushed out from the other end of the rolling element insertion jig 33 thereby loading a plurality of rolling elements 18 and the separators 22 to the rolling element return channel 20 in the slider 14 from the through-hole 25 continuously.

Thus, the rolling elements 18 and the separators 22 are loaded alternately from the through-hole 25 to the rolling element return channel 20. Then, the rolling elements 18 and the separators 22 loaded in the rolling element return channel 20 are moved and the rolling elements 18 and the separators 22 are loaded in the entire inside of the slider 14.

Figure 42:
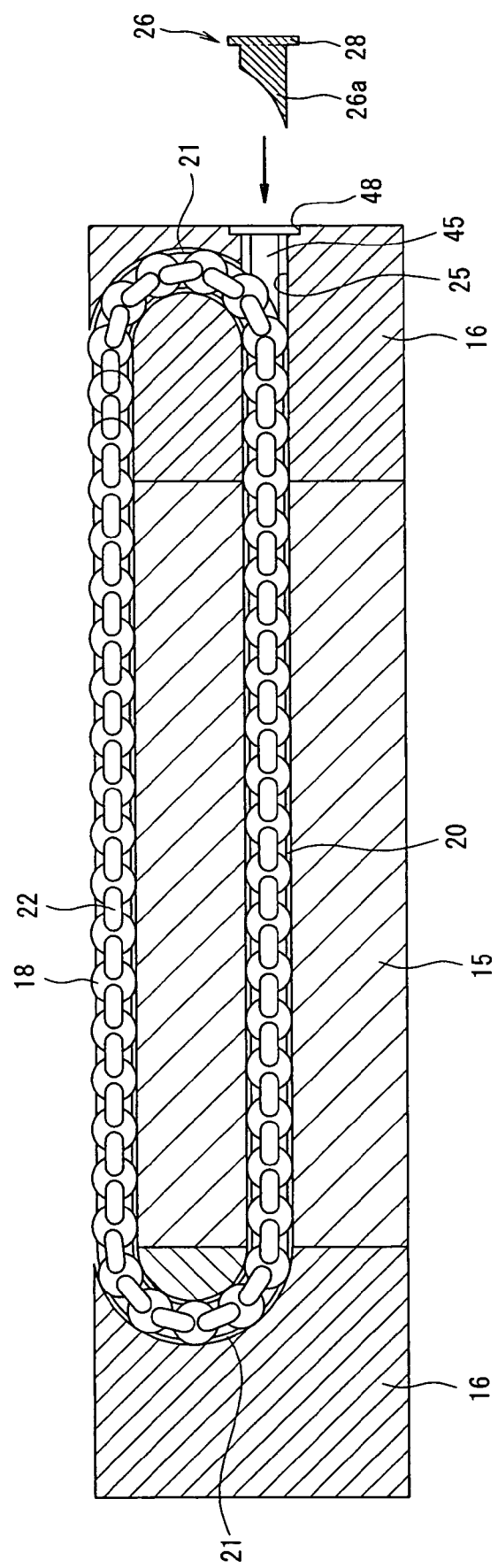
FIG. 42 is an explanatory view for explaining a method of loading rolling elements and separators by using the rolling element insertion jig shown in FIG. 39.
Figure 43:
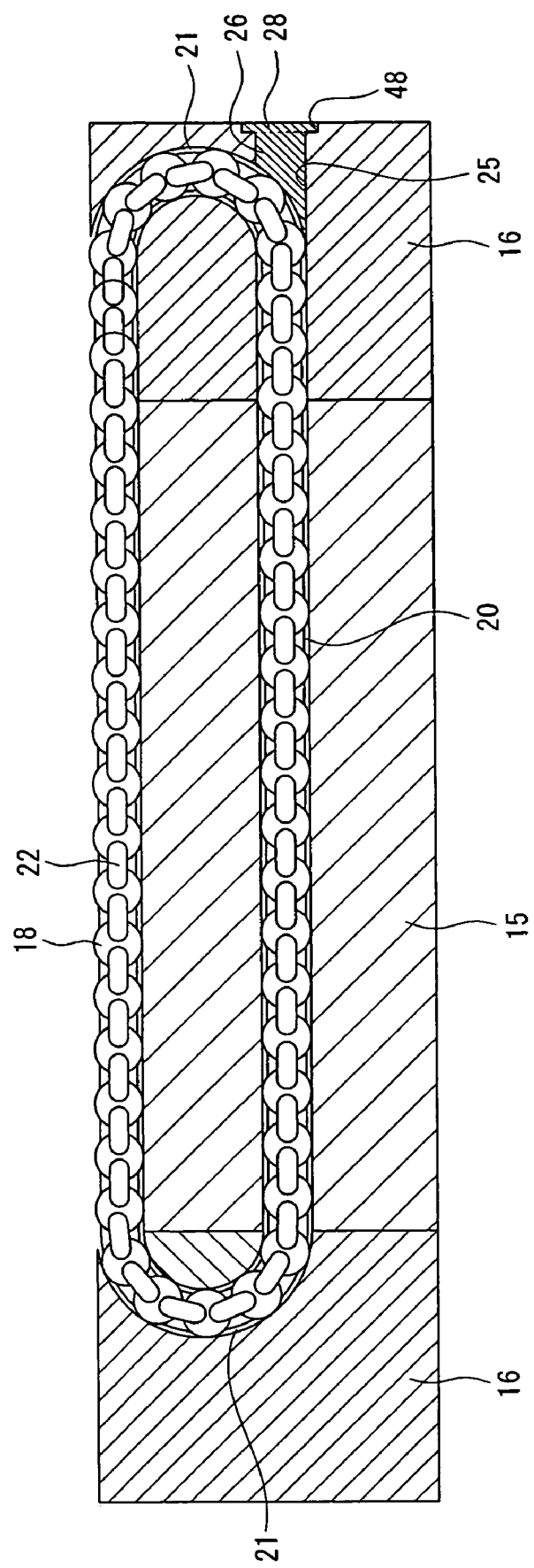
FIG. 43 is an explanatory view for explaining a method of loading rolling elements and separators by using the rolling element insertion jig shown in FIG. 39.

Then, as shown in FIG. 42, the rolling element insertion jig 33 is detached from the through-hole 25 of the end cap 16. Then, as shown in FIG. 43, the cap member 16 is fitted to the through-hole 25 and the through-hole 25 is closed by the cap member 16.

Figure 66:
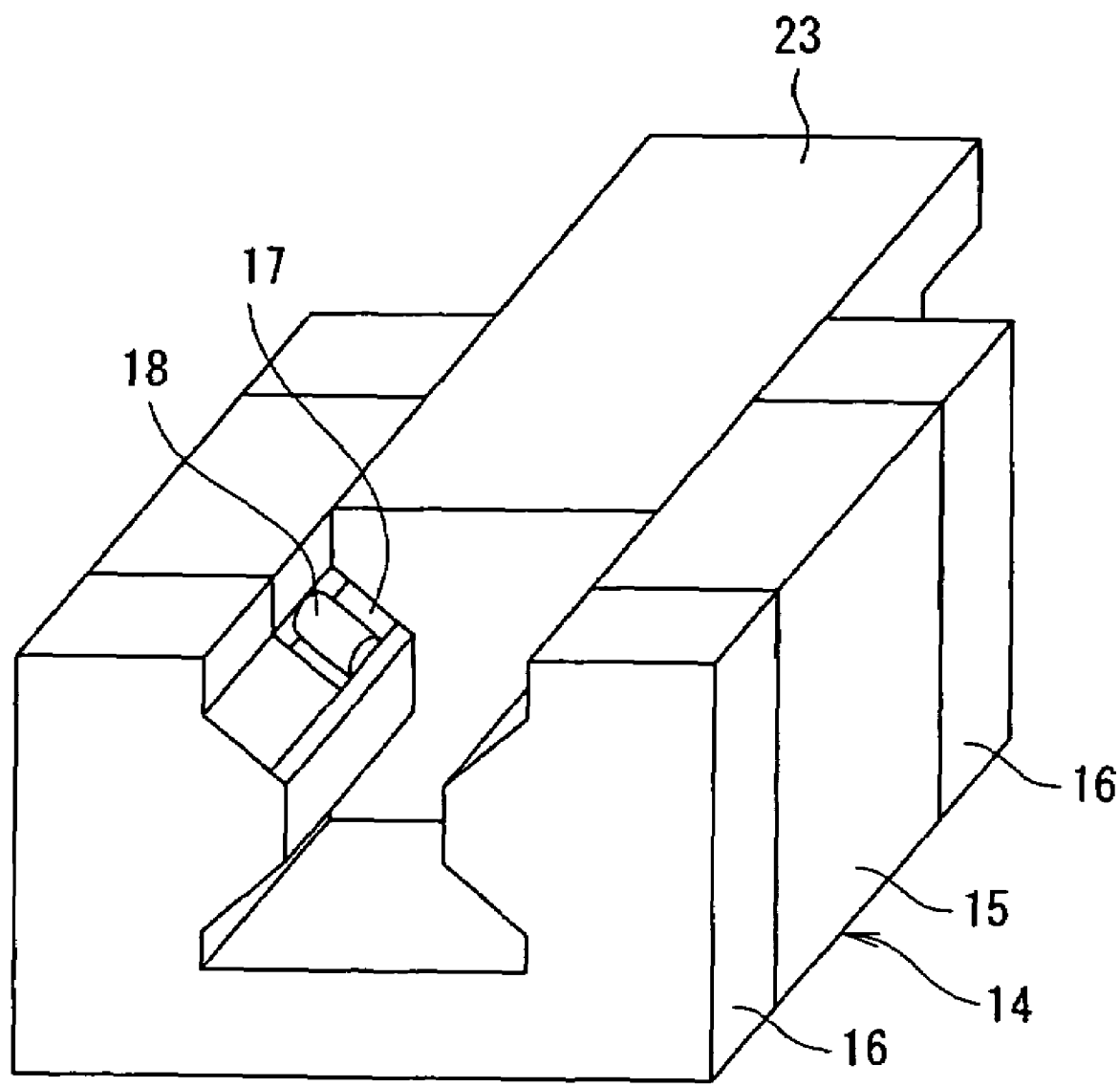
FIG. 66 is a view for explaining a method of assembling rolling elements and separators into the slider shown in FIG. 63.

As described above according to the linear guide device of this embodiment, since the rolling elements 18 and the separators 22 can be loaded from the through-hole 25 provided in the end cap 16 into the slider 14, and since the rolling elements 18 and the separators 22 can be loaded in the slider 14 without using the provisional shaft 23 as shown in FIG. 66, the assembling property of the linear guide device can be enhanced.

Further, by assembling the plurality of rolling elements 18 and the separators 22 into the slider 14 continuously by applying a force from the other end of the rolling element insertion jig 33 to which the plurality of rolling elements 18 and the separators 22 are previously assembled, the separators 22 can be prevented from being loaded in the slider 14 in a tilted state.

Figure 44A:
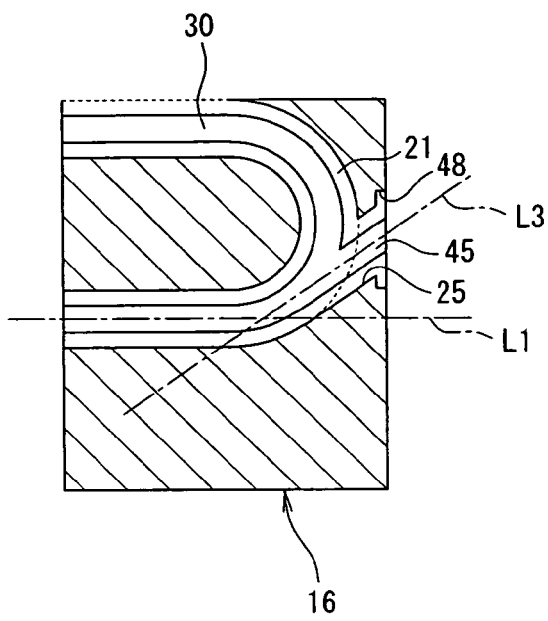
FIG. 44A and FIG. 44B are views showing a modified example of a through-hole shown in FIG. 36.
Figure 44B:
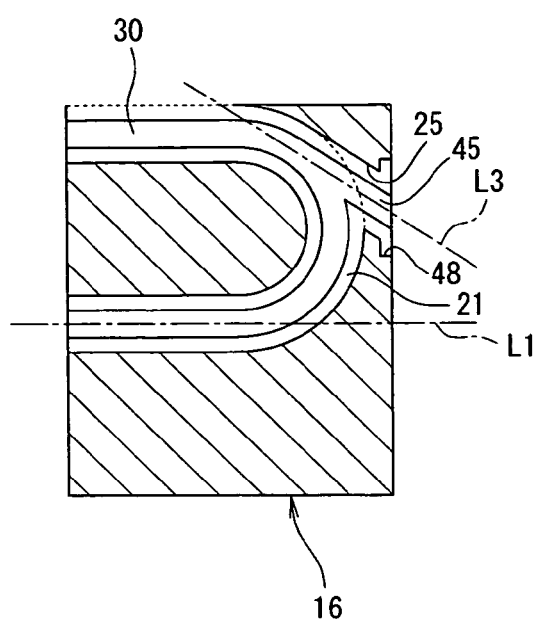
Figure 45A:
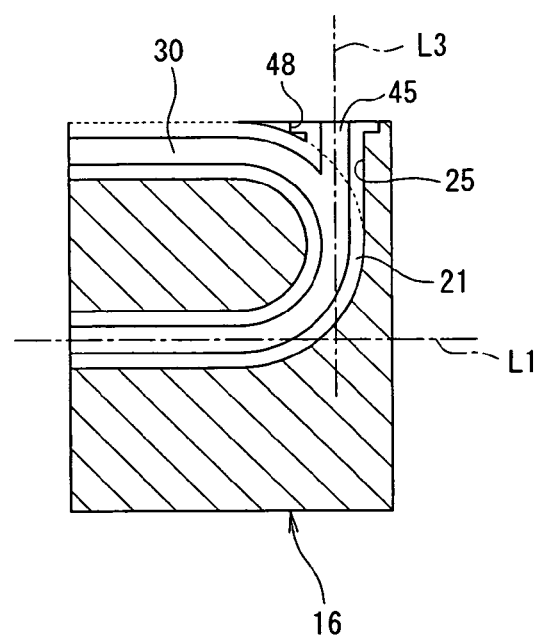
FIG. 45A and FIG. 45B are views showing a modified example of a through-hole shown in FIG. 44A and FIG. 44B.
Figure 45B:
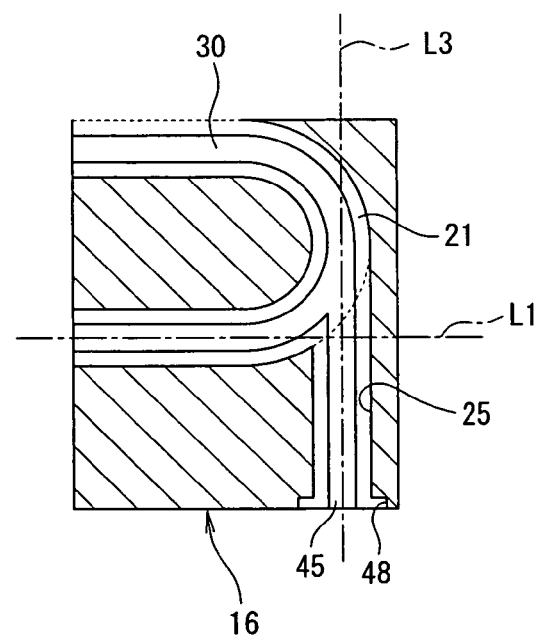

In the sixth embodiment described above, while an example of providing the end cap 16 with the through-hole 25 along the extension line L1 of the rolling element return channel 20 is shown, the through-hole 25 may also be provided in the end cap such that the center line L3 of the through-hole 25 obliquely intersects the extension line L1 of the rolling element return channel 20 as shown in FIG. 44A and FIG. 44B. Further, as shown in FIG. 45A and FIG. 45B, the through-hole 25 may also be provided in the end cap 16 such that the center line L3 of the through-hole 25 intersects, at a right angle, the extension line L1 of the rolling element return channel 20.

In the sixth embodiment described above, while the hole 48 as positioning portions for positioning the cap member 26 is formed as a rectangular shape at a size slightly larger than that of the through-hole 25, the shape of the hole 48 may be a shape as shown in FIG. 46 or FIG. 48. In this case, the shape of the engaging portion 28 provided to the cap member 26 is preferably a shape as shown in FIG. 47A to FIG. 47C or FIG. 49A to FIG. 49C.

In the sixth embodiment described above, while the hole 48 as the positioning portion for positioning the cap member 26 is disposed to the end face 162 of the end cap 16, a groove 49 (refer to FIG. 50A and FIG. 50B) may be provided instead of the hole 48 to the inner surface of the through-hole 25 formed in the end cap 16. In this case, the engaging portion 28 provided to the cap member 26 preferably has a shape as shown in FIG. 51A to FIG. 51C.

In the sixth embodiment described above, while the guide groove 45 for guiding the arm portion 223 of the separator 22 is disposed to the inner wall surface 251 of the through-hole 25, the guide groove 45 to be formed to the inner wall surface 251 of the through-hole 25 can be saved not by aligning the length W2 of the longer side of the through-hole 25 with the axial length W1 of the rolling element but by aligning the same with the size W2 between the arm portions 223 of the separator 22.

Figure 52A:
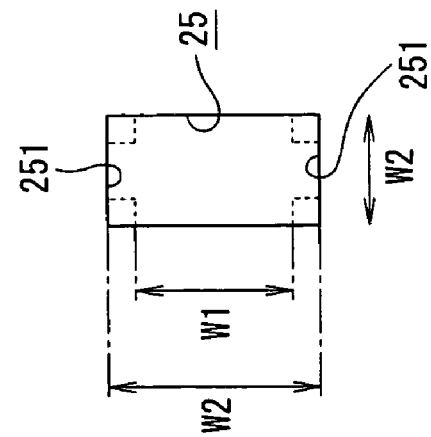
FIG. 52A to FIG. 52E are views showing a modified example of a through-hole in a case where the through-hole formed in the end cap has no guide groove.
Figure 52B:
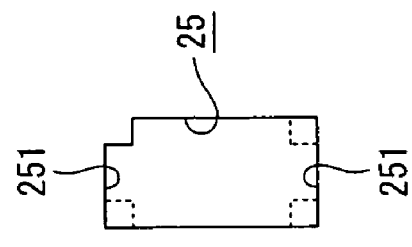
Figure 52C:
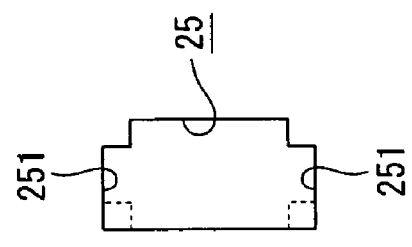
Figure 52D:
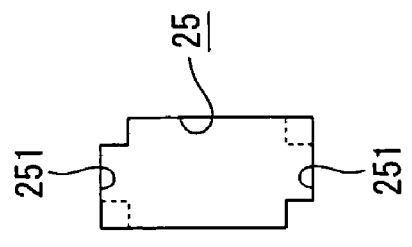
Figure 52E:
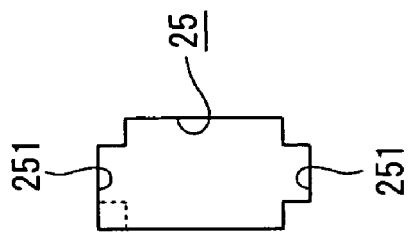
Figure 53E:
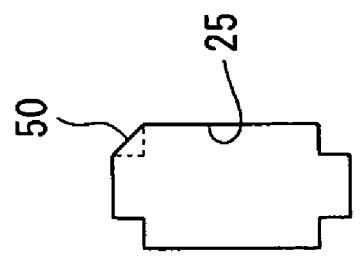
FIG. 53A to FIG. 53E are views showing a modified example of a through-hole in a case where the through-hole formed in the end cap has no guide groove.
Figure 53D:
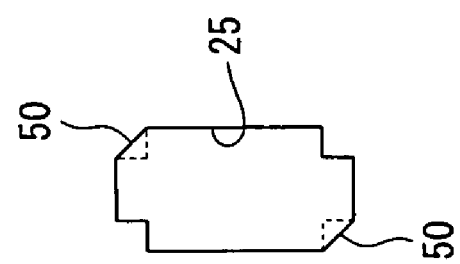
Figure 53C:
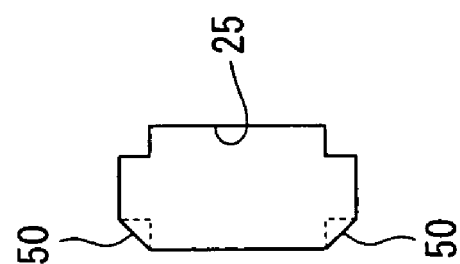
Figure 53B:
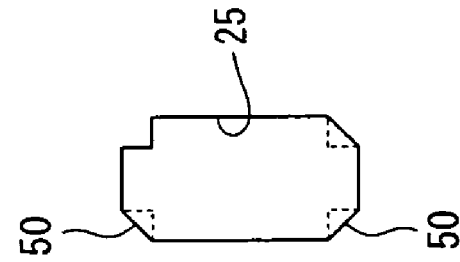
Figure 53A:
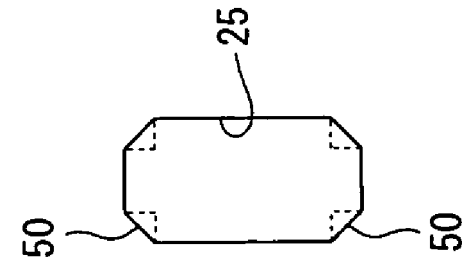
Figure 54E:
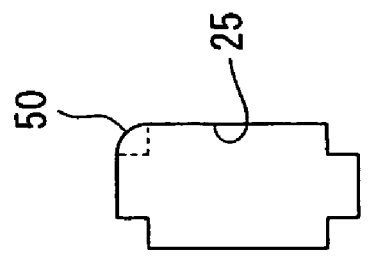
FIG. 54A to FIG. 54E are views showing an example in a case of obliquely chamfering the corner of a through-hole.
Figure 54D:
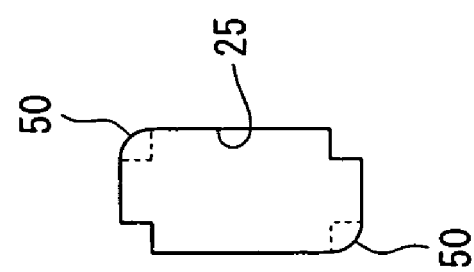
Figure 54C:
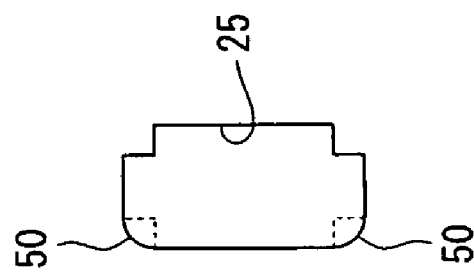
Figure 54B:
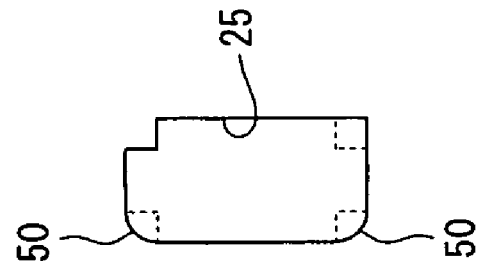
Figure 54A:
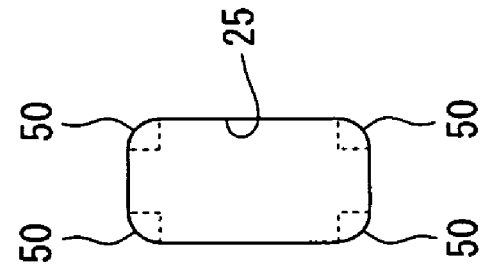
Figure 55A:
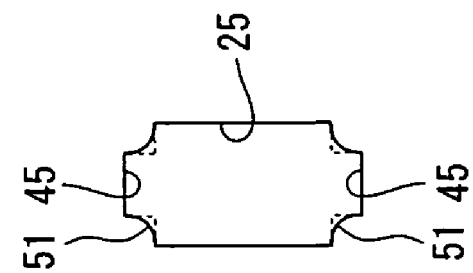
FIG. 55A to FIG. 55E are views showing an example in a case of accurately chamfering the corner of s through-hole.
Figure 55B:
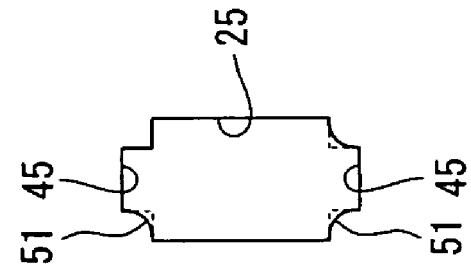
Figure 55C:
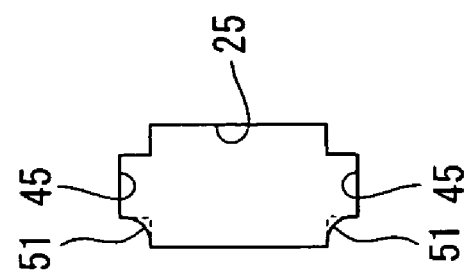
Figure 55D:
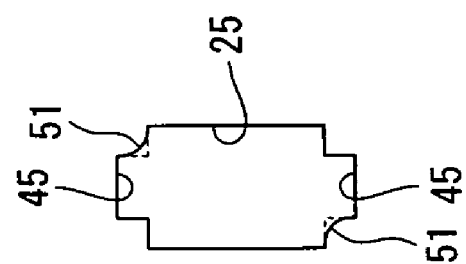
Figure 55E:
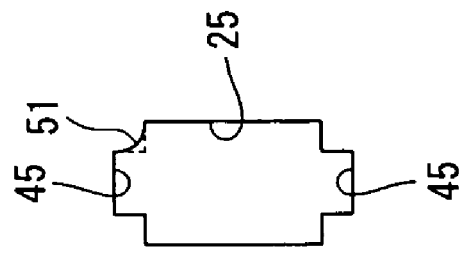

In the embodiment shown in FIG. 52A, while the cross section of the through-hole 25 crossing the assembling direction of the rolling element 18 and the separators 22 at a right angle is formed as a rectangular shape, but this is not always rectangular shape but the cross sectional shape of the through-hole 25 may also be such a shape, for example, as shown in FIG. 52B to FIG. 52E. Further, in a case where the cross section of the through-hole 25 crossing the direction of assembling the rolling elements 18 and the separators 22 at a right angle has a rectangular shape, it is preferred to dispose a chamfered portion 50 as shown in FIG. 53A to FIG. 53E or FIG. 54A to FIG. 54E to at least one of four corners of the through-hole 25.

Further, in a case where the through-hole 25 has the guide groove 45, as shown in FIG. 55A to FIG. 55E, it is preferred to chamfer the corner of the guide groove into an arcuate shape and provide at least one chamfered portion 51 to the through-hole 25.

Figure 35A:
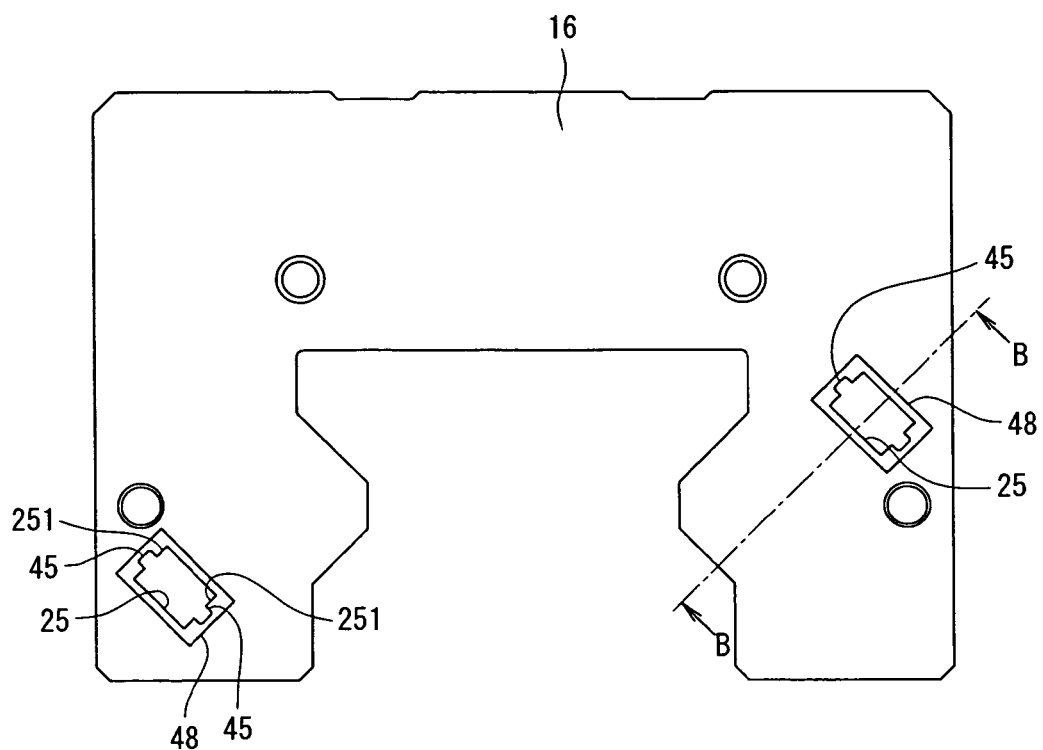
FIG. 35A and FIG. 35B are front elevational views of an end cap shown in FIG. 33.
Figure 35B:
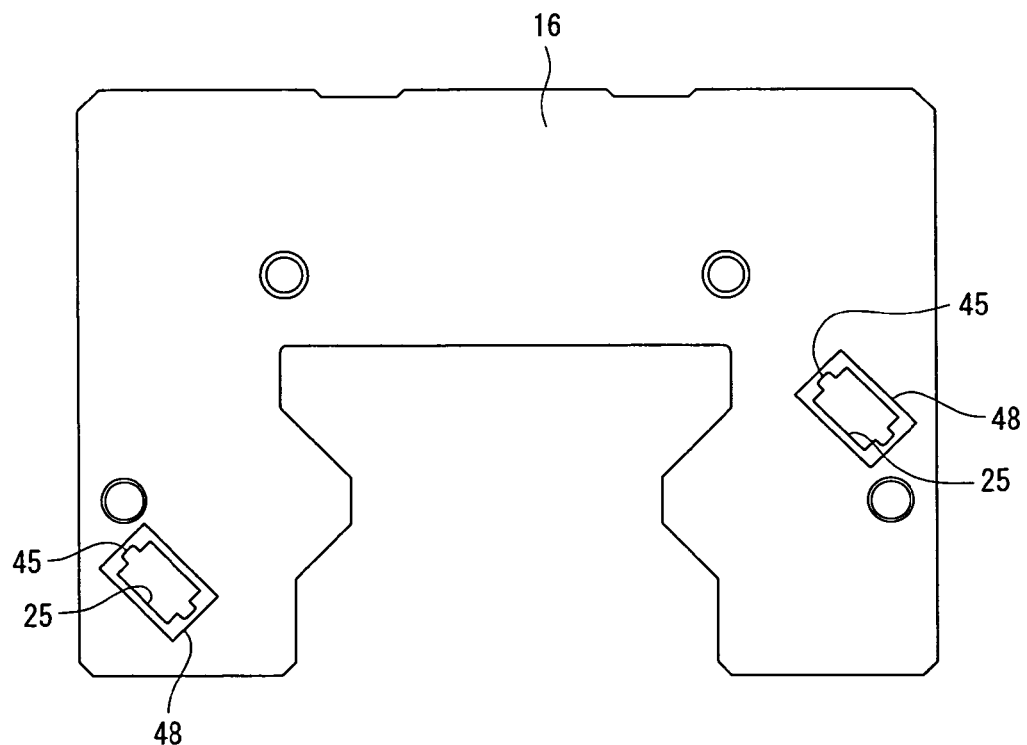
Figure 36:
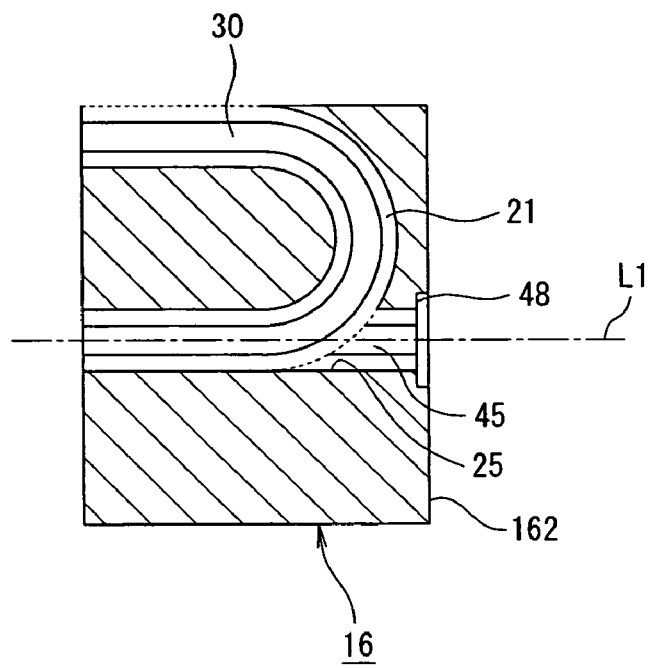
FIG. 36 is a B-B cross sectional view of FIG. 35A and FIG. 35B.
Figure 37:
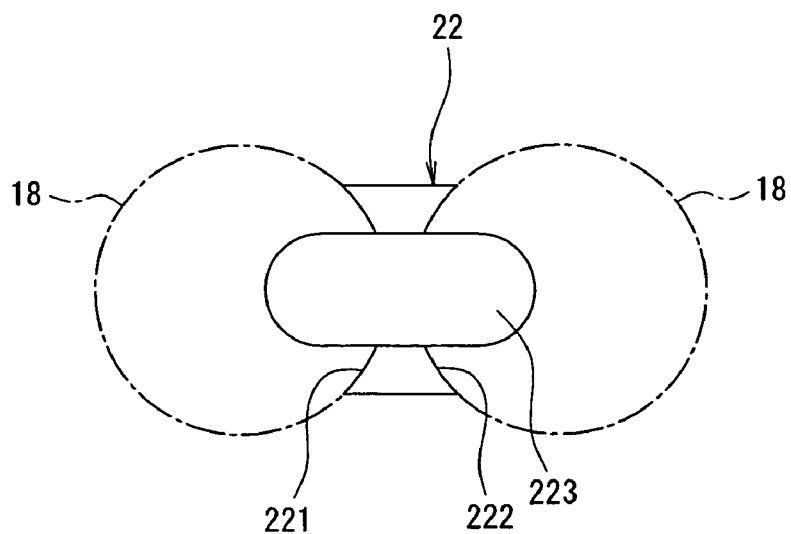
FIG. 37 is a side elevational view of a separator.
Figure 38D:
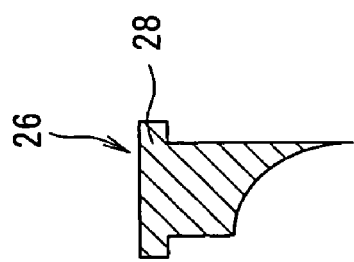
FIG. 38A to FIG. 38D are views showing a cap member detachably fitting to a through-hole of the end cap.
Figure 38C:
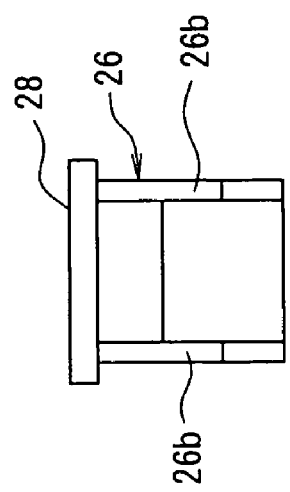
Figure 38B:
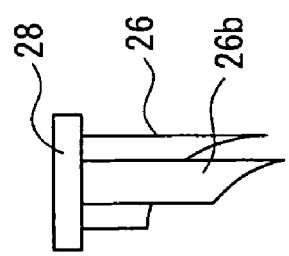
Figure 38A:
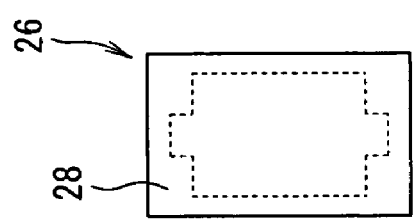

In the embodiment shown in FIG. 35A and FIG. 35B, while the length for the shorter side of the through-hole 25 is made substantially equal with the diameter of the rolling element, the length W4 for the shorter side of the through-hole 25 may be partially or entirely made longer than the diameter W3 of the rolling element as shown in FIG. 56A to FIG. 56F.

In the embodiment shown in FIG. 52A to FIG. 52E, while the length for the longer side of the through-hole 25 is made substantially equal with the inter-arm size of the separator, the length W5 for the longer side of the through-hole 25 may be longer than the inter-arm size W2. Further, as shown in FIG. 58A to FIG. 58F, the length W4 for the shorter side of the through-hole 25 may be partially or entirely longer than the diameter W3 for the rolling element and the length W5 for the longer side of the through-hole 25 may be longer than the axial length W1 of the rolling element.

Figure 59:
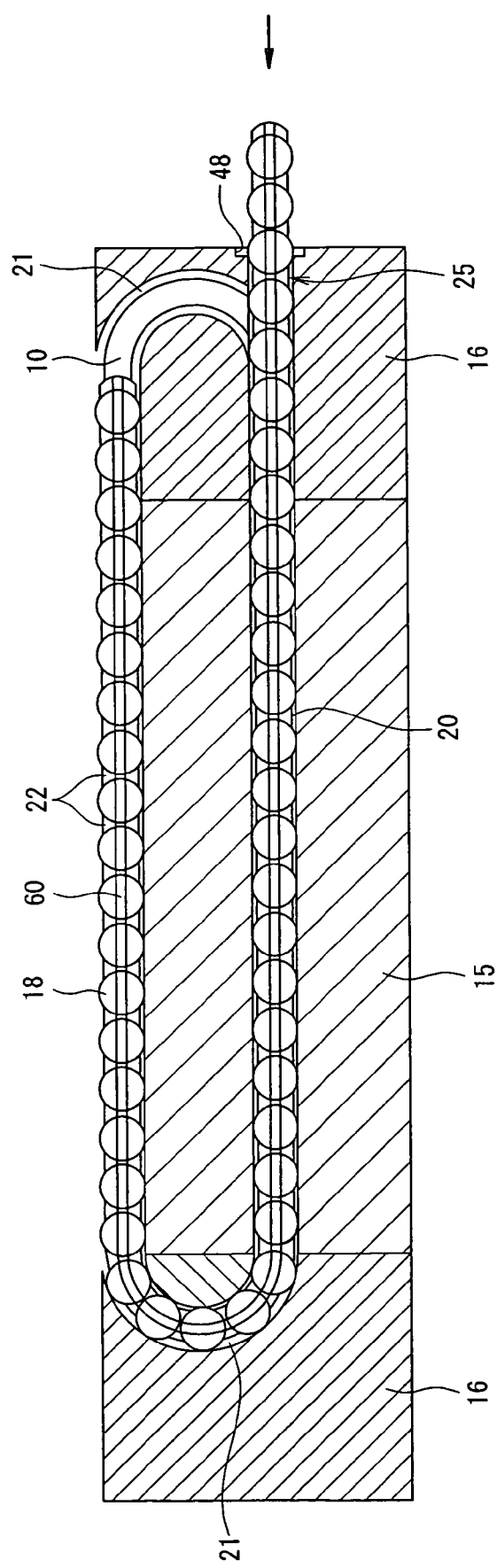
FIG. 59 is a view showing an example in a case where the rolling element is formed into a spherical shape.

While the separator to be interposed between each of the rolling elements and having a pair of right and left arms 223 is used in the embodiment shown in FIG. 41, separators 22 connected with a flexible belt-like connection member 60 may also be used as shown in FIG. 59.

Further, in each of the embodiments described above, while the example of rolling elements each formed into a cylindrical shape have been shown, in a case where the rolling element is formed into a spherical shape, it is preferred that the cross section of the through-hole 25 crossing the loading direction of the rolling elements and the separators at a right angle is formed into the shape as shown in FIG. 60A to FIG. 60G, and the shape of the cap member 26 is formed as a shape as shown in FIG. 61 and FIG. 62A to FIG. 62C.

The invention claimed is:

1. A linear guide device including a guide rail, a slider main body having rolling element raceway surfaces opposing to rolling element raceway surfaces formed on the guide rail along the longitudinal direction of the guide rail, end caps each having rolling element direction changing channels in communication with a rolling element load rolling channel formed between both of rolling element raceway surfaces of the guide rail and the slider main body and in communication with rolling element return channels perforated through the slider main body along the longitudinal direction of the guide rail, a plurality of rolling elements that roll through the rolling element load rolling channel, the rolling element return channel, and the rolling element direction changing channel along with the relative linear motion of a slider comprising the slider main body and the end caps, and a plurality of separators each interposed between adjacent two rolling elements among the plurality of the rolling elements, in which the end cap has through-holes for assembling the rolling elements and the separators from the outside of the slider into the rolling element return channel.

2. A linear guide device according to claim 1, wherein the end cap has cap members for closing the through-holes.

3. A linear guide device according to claim 2, wherein the end cap has positioning portions for positioning the cap members.

4. A linear guide device according to claim 3, wherein the cap member has engaging portions engaging the positioning portions.

5. A linear guide device according to claim 2, wherein the cap members fit in the through-holes to form portions of the rolling element direction changing channel.

6. A linear guide device according to claim 1, wherein the rolling element is a roller.

7. A linear guide device according to claim 1, wherein the separator has a concave rolling element contact surface in contact with the rolling element.

8. A linear guide device according to claim 1, wherein the separator includes a main body portion situating between the rolling elements and a pair of right and left arm portions disposed on both sides of the main body portion.

9. A linear guide device according to claim 8, wherein the through-hole has guide grooves slidably engaging the arm portions of the separator.

10. A linear guide device according to claim 8, wherein the rolling element return channel and the rolling element direction changing channel have guide grooves for slidably engaging the arm portions of the separator.

11. A linear guide device according to claim 8, wherein the rolling elements and the separators are assembled from the through-hole into the slider by using a rolling element insertion jig having two inner wall surfaces opposing to the sides of the arm portion respectively.

12. A linear guide device according to claim 11, wherein the rolling element insertion jig is formed into a shape as fitting to the through-hole.

13. A linear guide device according to claim 12, wherein the end cap has positioning members that engage the top end of the rolling element insertion jig to position the rolling element insertion jig and position the cap member.

14. A linear guide device according to claim 1, wherein the separators are connected in a row by a flexible belt-like connection member.

15. A linear guide device according to claim 1, wherein the through-holes are formed in the end cap so as to oppose to the rolling element return channels.

16. A linear guide device according to claim 1, wherein the through-holes are formed in the end cap coaxially with an extension line extended from the centerline of the rolling element return channel.

17. A linear guide device according to claim 1, wherein the through-holes are formed in the end cap with an area of opening being larger than the area of opening for the rolling element return channel.

18. A linear guide device according to claim 1, wherein the through-holes are formed in the end cap with an area of opening being substantially equal with the area of opening for the rolling element return channel.

19. A linear guide device according to claim 1, wherein the through-holes are formed in the end cap so as to intersect the extension line extended from the center line of the rolling element return channel.

20. A linear guide device according to claim 1, wherein the through-holes are formed into a shape including a portion of the cross sectional shape of the rolling element return channel.

21. A linear guide device according to claim 1, wherein the rolling element is a ball.

* * * * *